(12) United States Patent
Ibrahim et al.

(10) Patent No.: US 10,404,506 B2
(45) Date of Patent: Sep. 3, 2019

(54) METHODS AND DEVICES FOR INTERFERENCE VARIANCE ESTIMATION AND INTERFERENCE CANCELLATION

(71) Applicant: Intel IP Corporation, Santa Clara, CA (US)

(72) Inventors: Ahmed S. Ibrahim, Cairo (EG); Mohamed F. Marzban, Cairo (EG); Belal S. Amin, Cairo (EG)

(73) Assignee: Intel IP Corporation, Santa Clara, CA (US)

( * ) Notice: Subject to any disclaimer, the term of this patent is extended or adjusted under 35 U.S.C. 154(b) by 64 days.

(21) Appl. No.: 15/708,903

(22) Filed: Sep. 19, 2017

(65) Prior Publication Data

US 2018/0006859 A1   Jan. 4, 2018

Related U.S. Application Data

(63) Continuation of application No. 14/700,382, filed on Apr. 30, 2015, now Pat. No. 9,794,097.

(30) Foreign Application Priority Data

Jun. 24, 2014   (DE) .................. 10 2014 108 835

(51) Int. Cl.
*H04L 27/26* (2006.01)
*H04W 24/08* (2009.01)
(Continued)

(52) U.S. Cl.
CPC ........ *H04L 27/2601* (2013.01); *H04L 5/0007* (2013.01); *H04W 24/02* (2013.01); *H04W 24/08* (2013.01)

(58) Field of Classification Search
None
See application file for complete search history.

(56) References Cited

U.S. PATENT DOCUMENTS 9,608,678 B1 *   3/2017   Sun .................. H04B 1/10
2005/0152480 A1 *   7/2005   Chang .............. H04B 1/1027
                                                    375/343

(Continued)

OTHER PUBLICATIONS

T. Yucek and H. Arslan, "MMSE Noise Plus Interference Power Estimation in Adaptive OFDM Systems," in IEEE Transactions on Vehicular Technology, vol. 56, No. 6, pp. 3857-3863, Nov. 2007 (Year: 2007).*

(Continued)

*Primary Examiner* — Charles C Jiang
*Assistant Examiner* — Saad Khawar
(74) *Attorney, Agent, or Firm* — Schiff Hardin LLP

(57) ABSTRACT

An interference variance estimation method includes receiving a composite sample comprising a sample of a first OFDM transmission scheme interfered by out-of-band interference of a second OFDM transmission scheme; determining for each of the resource elements of the first transmission scheme a power estimate of the out-of-band interference; and filtering the power estimates over subcarriers corresponding to a same symbol, wherein weights of the filtering are based on a correlation property of the power estimates with respect to the subcarriers. An interference cancellation method includes: receiving the composite sample; determining a first estimate of the out-of-band interference with respect to non-data bearing subcarriers; determining a second estimate of the out-of-band interference with respect to data bearing subcarriers based on the first estimate; and cancelling the out-of-band interference based on the composite signal and the second estimate.

29 Claims, 17 Drawing Sheets

(51) Int. Cl.
*H04L 5/00* (2006.01)
*H04W 24/02* (2009.01)

(56) References Cited

U.S. PATENT DOCUMENTS

| | | | |
|---|---|---|---|
| 2008/0181324 A1* | 7/2008 | Waters | H04L 1/206 375/260 |
| 2015/0055568 A1* | 2/2015 | Jindal | H04B 15/00 370/329 |
| 2015/0078429 A1* | 3/2015 | Chen | H04L 25/03159 375/232 |

OTHER PUBLICATIONS

Yücek, et al., "MMSE Noise Power and SNR Estimation for OFDM Systems", Dept. of Electrical Engineering, University of Florida, 4 pgs.

* cited by examiner

METHODS AND DEVICES FOR INTERFERENCE VARIANCE ESTIMATION AND INTERFERENCE CANCELLATION

FIELD

The disclosure relates to a method and a device for interference variance estimation and a method and a device for interference cancellation. In particular, the disclosure relates to methods and devices for WiFi Out-of-band Self-Interference Variance Estimation and methods and devices for In-Device Coexistence (IDC) Interference Cancellation on LTE/WiFi Platforms.

BACKGROUND

User Equipments (UEs) may be connected to different wireless communication networks, for example LTE (Long Term Evolution) communication networks and WiFi communication networks. The UE may be subject to strong interference fluctuations due to out-of-band (OOB) leakage from adjacent frequency bands. As depicted in FIG. 1 in a current LTE communications scheme providing an LTE communication 102 between an LTE base station 101 and the UE 105 the LTE frequency band may be ranging from 2.3-2.4 GHz that is adjacent to a WiFi ISM band that may range from 2.4-2.5 GHz. A time-frequency (or symbol-subcarrier) grid 200 representing an OFDM signal, e.g. an LTE signal, is illustrated in FIG. 2. As the LTE band is adjacent to the WiFi band, the LTE receiver in the UE 105 suffers from the WiFi out-of-band (OOB) leakage 106 into its LTE band due to the adjacent WiFi communication 104 between a WiFi HotSpot 103 and a WiFi transmitter in the UE 105. The UE 105 depicted in FIG. 1 includes a WiFi transmitter together with an LTE receiver in the same UE device. As both communications coexist in the same device, the OOB leakage problem caused by such devices is also called "In-Device Coexistence" (IDC) problem. This problem causes a significant degradation to the performance of the LTE communication 102. It may be desirable to provide a technique reducing such out-of-band leakage.

BRIEF DESCRIPTION OF THE DRAWINGS

The accompanying drawings are included to provide a further understanding of aspects and are incorporated in and constitute a part of this specification. The drawings illustrate aspects and together with the description serve to explain principles of aspects. Other aspects and many of the intended advantages of aspects will be readily appreciated as they become better understood by reference to the following detailed description Like reference numerals designate corresponding similar parts.

DETAILED DESCRIPTION

Figure 1:
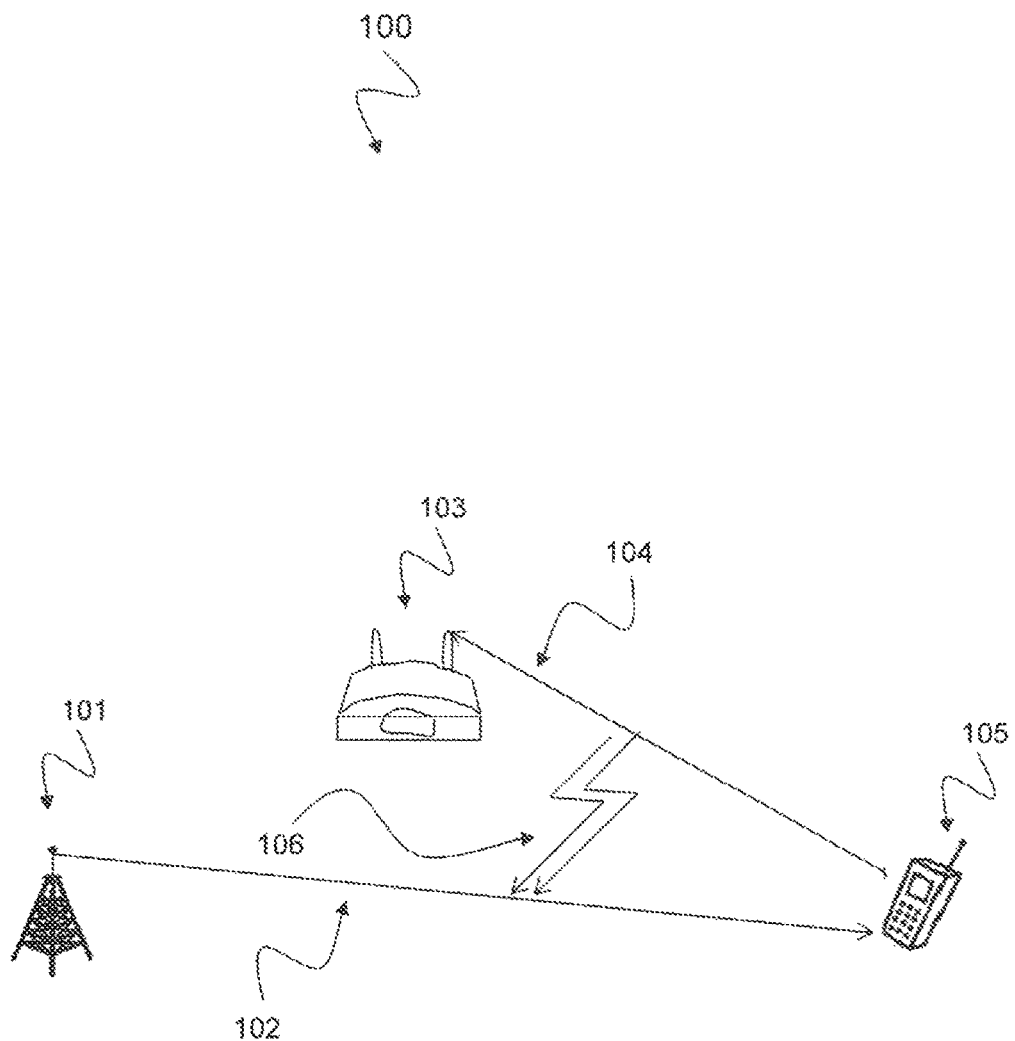
FIG. 1 is a schematic diagram 100 of an LTE communication 102 interfered by a WiFi communication 104.

In the following detailed description, reference is made to the accompanying drawings, which form a part thereof, and in which is shown by way of illustration specific aspects in which the disclosure may be practiced. It is understood that other aspects may be utilized and structural or logical changes may be made without departing from the scope of the present disclosure. The following detailed description, therefore, is not to be taken in a limiting sense, and the scope of the present disclosure is defined by the appended claims.

The following terms, abbreviations and notations will be used herein:
CRS: Cell specific Reference Signal,
RE: Resource Element,
RB: resource block,
MMSE: Minimum Mean Square Error,
SINR: Signal to Interference and Noise Ratio,
LTE: Long Term Evolution,
RF: Radio Frequency,
UE: User Equipment,
WiFi: is a technology that allows an electronic device to exchange data or connect to the internet wirelessly using 2.4 GHz UHF and 5 GHz SHF radio waves. The Wi-Fi Alliance defines Wi-Fi as any "wireless local area network (WLAN) products that are based on the IEEE 802.11 standards,
OFDM: Orthogonal Frequency Division Multiplex,
OOB: Out-Of-Band,
AWGN: additive white Gaussian noise,
CF: center frequency,
Null tones: tones or subcarriers bearing no data,
IDC: In-Device Coexistence,
IC: Interference Cancellation.

The methods and devices described herein may be based on symbol-subcarrier grids and resource elements (REs). It is understood that comments made in connection with a described method may also hold true for a corresponding device configured to perform the method and vice versa. For example, if a specific method step is described, a corresponding device may include a unit to perform the described method step, even if such a unit is not explicitly described or illustrated in the figures. Further, it is understood that the features of the various exemplary aspects described herein may be combined with each other, unless specifically noted otherwise.

The methods and devices described herein may be implemented in wireless communication networks, in particular communication networks based on an LTE and/or OFDM standard and in particular MIMO communication systems. The methods and devices described below may be implemented in mobile equipments or devices (or mobile stations or User Equipments (UE)) like phones, tablets, etc. The described devices may include integrated circuits and/or passives and may be manufactured according to various technologies. For example, the circuits may be designed as logic integrated circuits, analog integrated circuits, mixed signal integrated circuits, optical circuits, memory circuits and/or integrated passives.

The methods and devices described herein may be configured to transmit and/or receive radio signals. Radio signals may be or may include radio frequency signals radiated by a radio *transmitting device (or radio transmitter or sender) with a radio frequency lying in a range of about 3 Hz to about 300 GHz. The frequency range may correspond to frequencies of alternating current electrical signals used to produce and detect radio waves.

Figure 2:
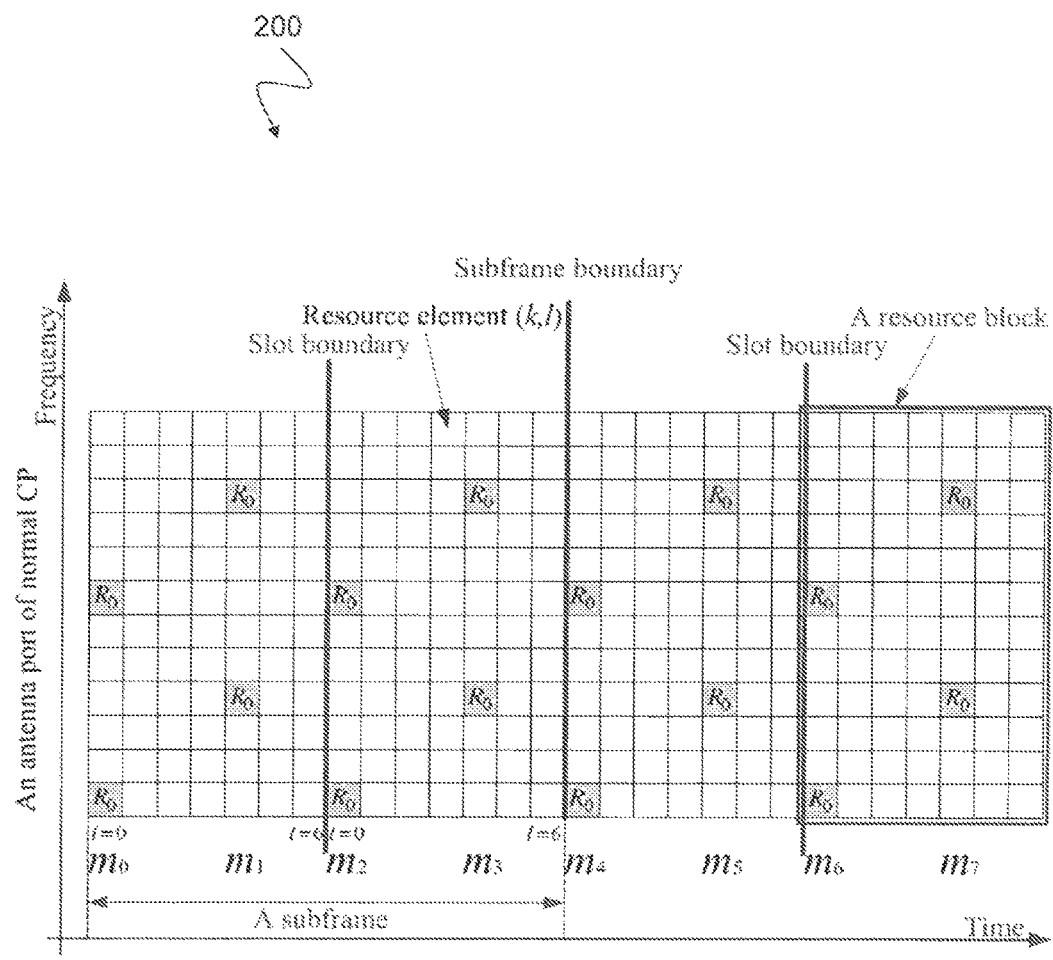
FIG. 2 is a diagram illustrating a time-frequency (or symbol-subcarrier) grid 200 representing an OFDM signal.

In the following, Orthogonal Frequency-Division Multiplexing (OFDM) systems are described. OFDM is a scheme for encoding digital data on multiple carrier frequencies. OFDM is a Frequency-Division Multiplexing (FDM) scheme used as a digital multi-carrier modulation method. A large number of closely spaced orthogonal sub-carrier signals may be used to carry data. The orthogonality may prevent crosstalk between sub-carriers. The data may be divided into several parallel data streams or channels, one for each sub-carrier, thereby forming a symbol-subcarrier grid as shown in FIG. 2. Each sub-carrier may be modulated with a conventional modulation scheme (such as quadrature amplitude modulation or phase-shift keying) at a low symbol rate, maintaining total data rates similar to conventional single-carrier modulation schemes in the same bandwidth. OFDM may be essentially identical to coded OFDM (COFDM) and discrete Multi-Tone modulation (DMT).

Figure 3:
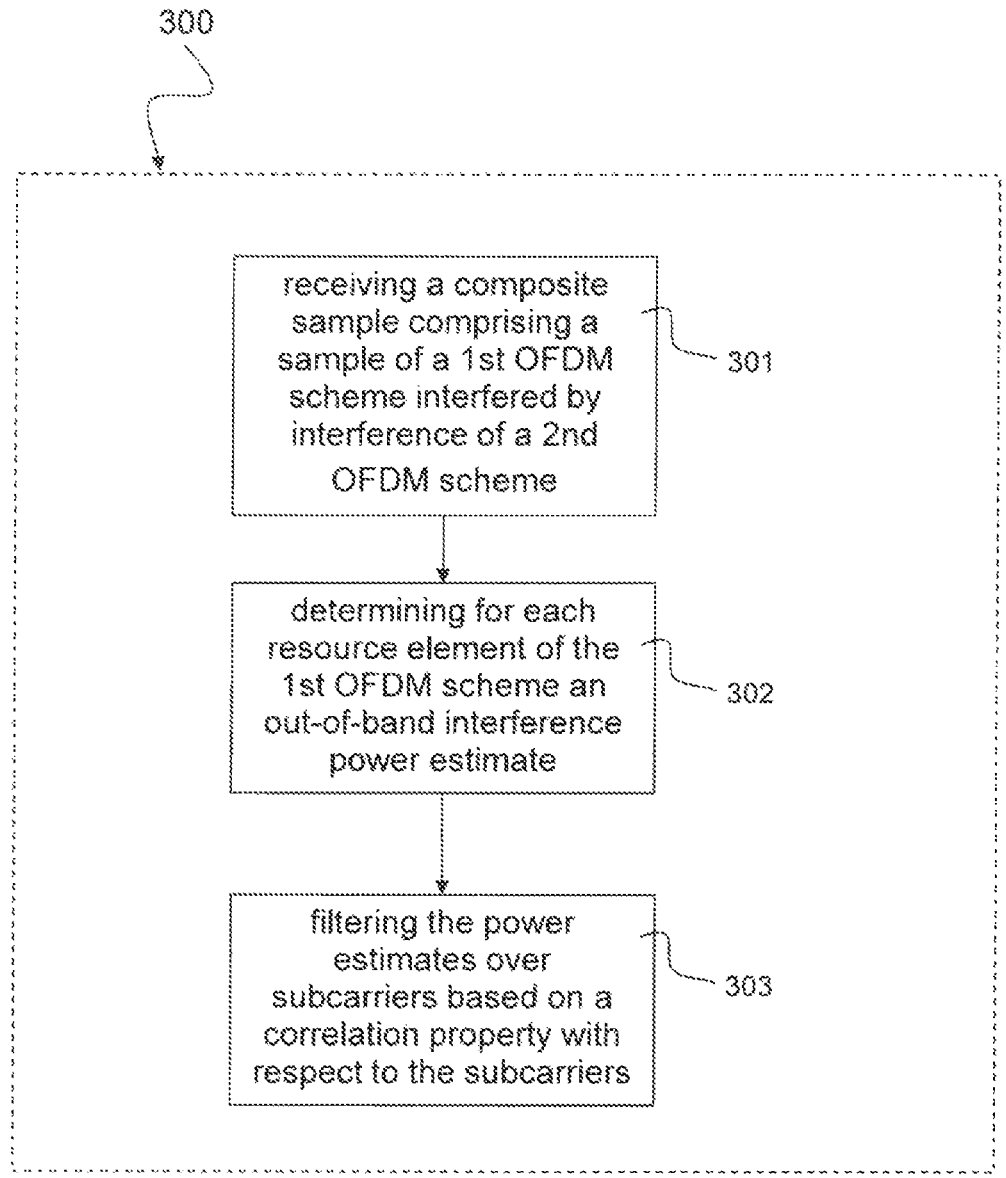
FIG. 3 is a schematic diagram of a method 300 for interference variance estimation in accordance with the disclosure.

In the following, cell-specific reference signals (CRS) and pilot symbols are described. To facilitate the estimation of the channel characteristics LTE uses cell specific reference signals also referred to as pilot symbols inserted in both time and frequency, thereby forming a time-frequency or symbol-subcarrier grid as shown in FIG. 2. These pilot symbols may provide an estimate of the channel at given locations within a subframe. Through interpolation it is possible to estimate the channel across an arbitrary number of subframes. CRS may be transmitted in each physical antenna port. It may be used for both demodulation and measurement purpose. Its pattern design ensures channel estimation accuracy. Cell-specific reference signals may be used for cell search and initial acquisition, downlink channel estimation for coherent demodulation/detection at the UE and downlink channel quality measurements. Interference measurements may be performed based on the cell-specific reference signals FIG. 3 is a schematic diagram of a method 300 for interference variance estimation in accordance with the disclosure. The interference variance estimation method 300 includes receiving 301 a composite sample including a sample of a first OFDM transmission scheme, e.g. LTE, interfered by out-of-band interference of a second OFDM transmission scheme, e.g. WiFi. The first OFDM transmission scheme includes a plurality of resource elements arranged in a symbol-subcarrier grid, e.g. as depicted in FIG. 2. The method 300 further includes determining 302 for each of the resource elements a power estimate of the out-of-band interference; and filtering 303 the power estimates over subcarriers corresponding to a same symbol of the grid to obtain the interference variance. Weights of the filtering are based on a correlation property of the power estimates with respect to the subcarriers.

The interference variance estimation method 300 may further include estimating the interference variance at a particular subcarrier based on time-averaging the interference variance of the particular subcarrier over symbols of the grid, e.g. as described by the time averaging block 407 described below with respect to FIG. 4. The time-averaging may be based on a sliding window. The filtering 303 of the power estimates may be performed over adjacent sets of subcarriers of the grid. The weights of the filtering 303 may be determined based on an MMSE algorithm as described below with respect to FIG. 4. For filtering 303 the power estimates no restrictions on the filter length exist. An optimum filter length may be for example 17 as described below with respect to FIG. 4.

The method 300 may further include determining a hypothesis S of the sample of the first OFDM transmission scheme based on a distance between the composite sample and a set of modulation symbols of the first OFDM transmission scheme. The method 300 may further include determining for each of the resource elements the power estimate of the out-of-band interference based on the received composite sample Y, the hypothesis S of the sample of the first OFDM transmission scheme and an estimated channel H as described below with respect to FIG. 4.

Figure 6:
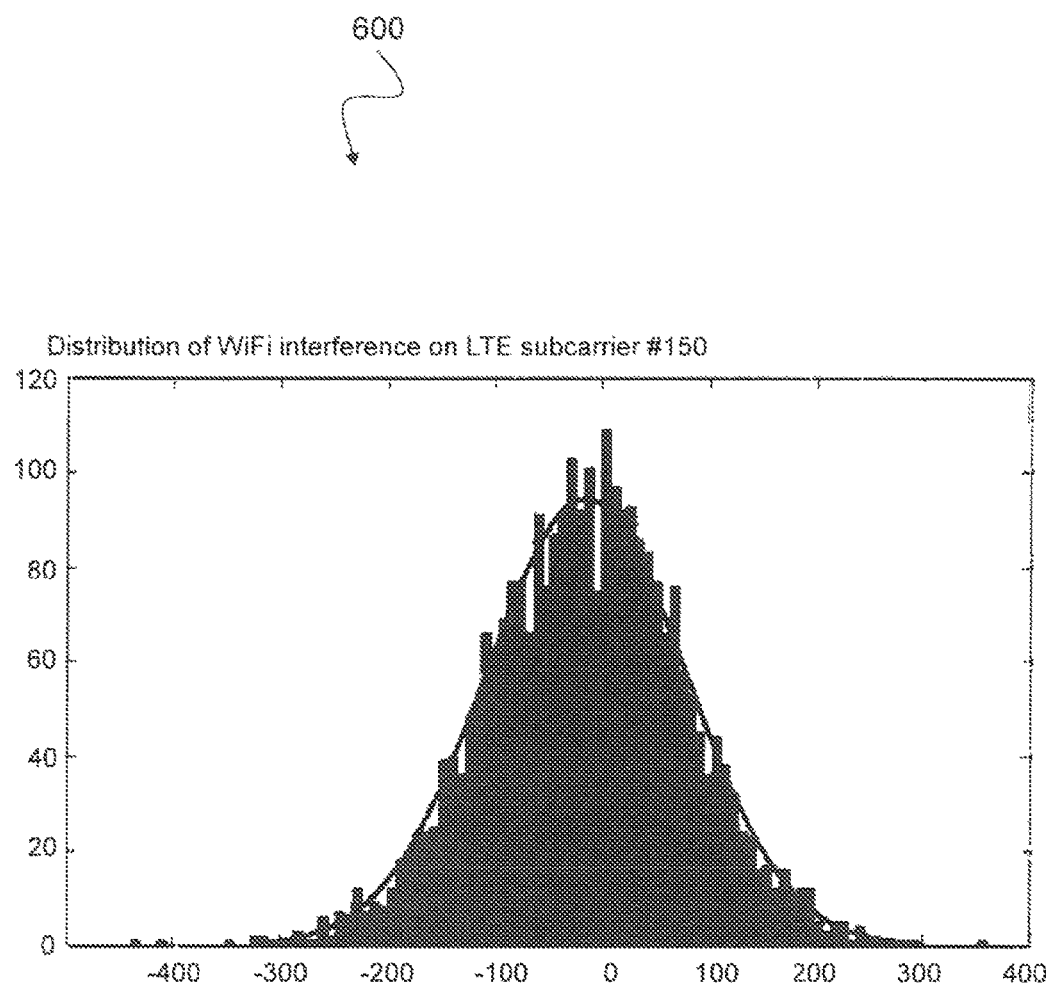
FIG. 6 is a diagram 600 illustrating an exemplary distribution of the WiFi interference on an LTE subcarrier.
Figure 7A:
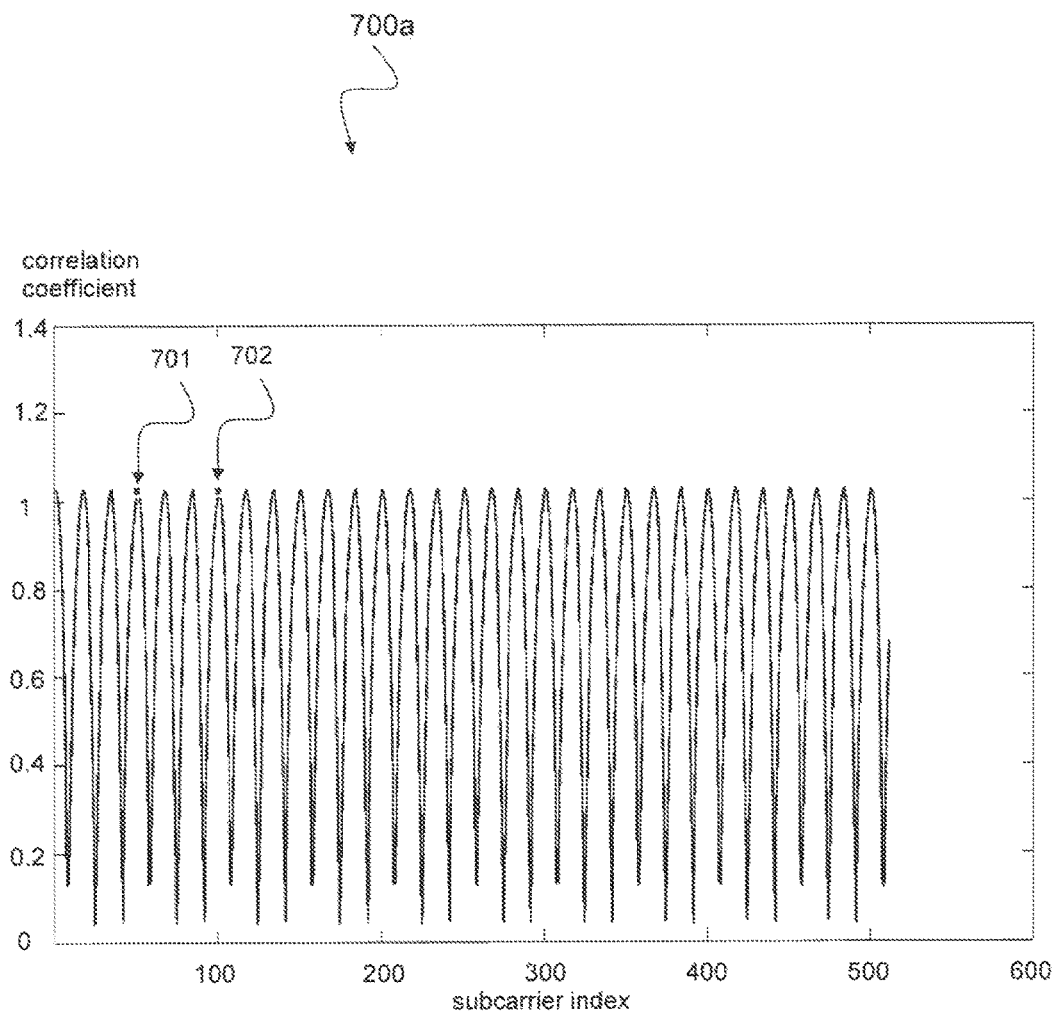
FIG. 7a is a diagram 700a illustrating an exemplary correlation of the WiFi interference on LTE subcarriers.

A correlation coefficient of power estimates corresponding to a predetermined subcarrier distance, in particular a subcarrier distance of 50, may be close to 1 as can be seen from FIG. 7a. A distribution of the out-of-band interference, e.g. WiFi, on each subcarrier of the first OFDM transmission scheme, e.g. LTE, may be Gaussian with zero mean as can be seen from FIG. 6.

In the following sections, it is shown that the WiFi 00B self-interference on the LTE subcarriers may be considered as zero-mean Gaussian random variables with a variable variance. That variable variance may decrease with increasing distance of the LTE subcarriers from the WiFi ISM band. Hence, aspects of the disclosure may estimate the variance of these Gaussian random variables. An estimation algorithm as presented below with respect to FIG. 4 may apply Minimum Mean Square Error (MMSE) across the frequency-domain subcarriers, making use of the correlation between the WiFi samples across neighboring sub-carriers. A time-averaging across the OFDM symbols may follow.

Figure 4:
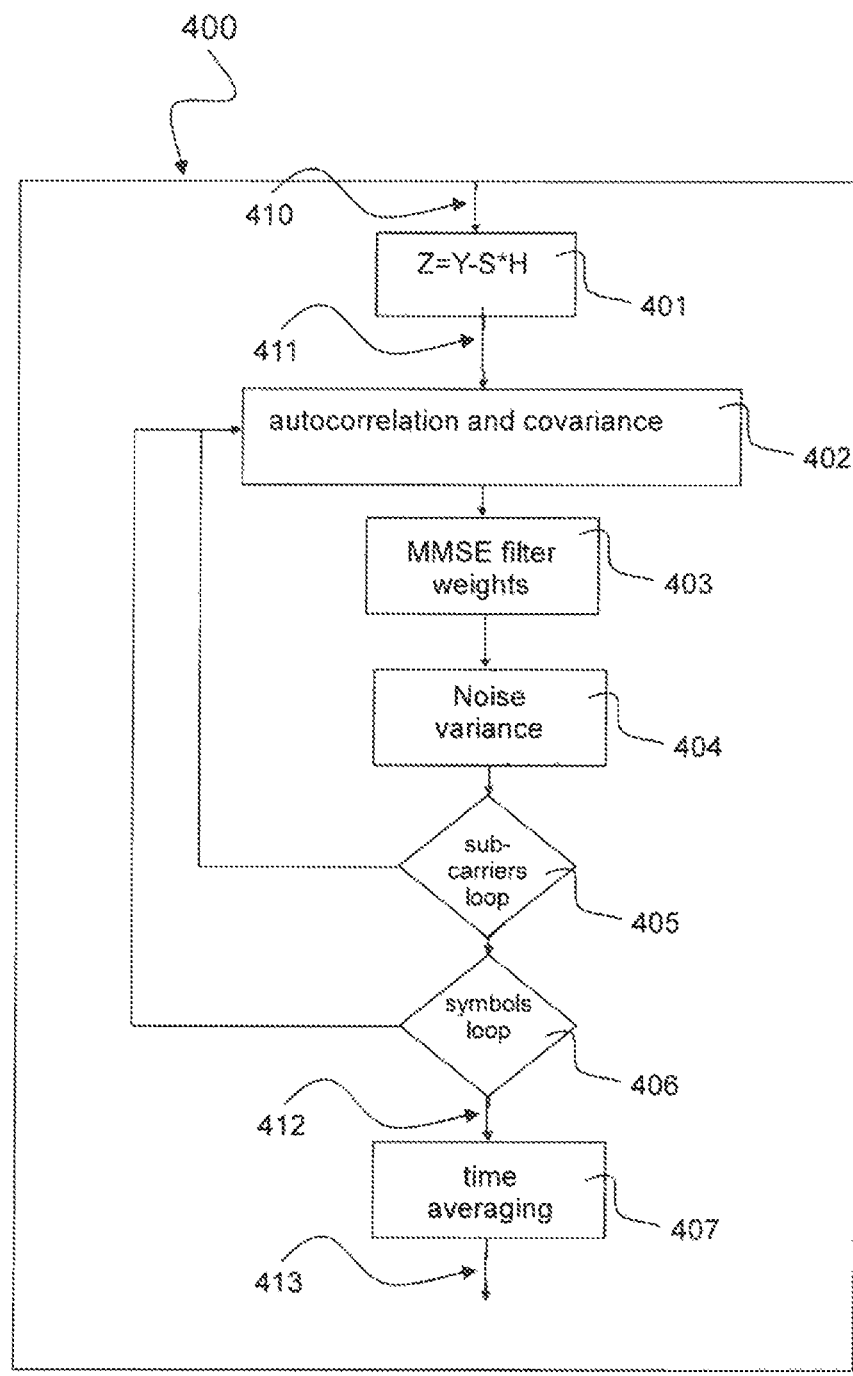
FIG. 4 is a flow chart illustrating an algorithm 400 for interference variance estimation in accordance with the disclosure.

FIG. 4 is a flow chart illustrating an algorithm 400 for interference variance estimation in accordance with the disclosure. It is described below with respect to FIG. 6 that the WiFi 00B self-interference may be considered as Gaussian with zero-mean and varying variance. Moreover, it is described below with respect to FIG. 7a that the WiFi samples across the sub-carriers are correlated with a correlation factor ranging from zero to about 1. The interference variance estimation algorithm 400 can be described by using the flow chart of FIG. 4.

The algorithm 400 may include a first processing block 401 receiving the noisy composite sample 410 or samples respectively which may include the LTE sample, the WiFi interference and the noise, e.g. AWGN (additive white Gaussian noise).

In the first processing block 401, the noisy received composite samples, i.e. LTE+WiFi+AWGN are compared with the LTE modulation symbols. The modulation symbol closest to the noisy sample represents the best hypothesis for the LTE sample. The difference between the noisy received sample and the best hypothesis for the LTE sample represents a hypothesis for the WiFi interference Z. In the first processing block 401, the operation $$Z=Y-S*H \quad (1)$$

may be performed, where Y is the noisy received LTE signal at each Resource Element (RE), S is the best hypothesis for the LTE modulation symbol and $|Z|^2$ represents the instantaneous WiFi power at each LTE RE. The instantaneous WiFi power 411 at each LTE RE ($|Z|^2$) is obtained which may be input to a second processing block 402. A current subcarrier of the subcarrier-symbol grid may be set to an initial subcarrier and a current symbol of the subcarrier-symbol grid may be set to an initial symbol. The subcarrier-symbol grid may be according to the illustration of FIG. 2.

In the second processing block 402 the autocorrelation function "r" and the covariance "C" between the current subcarrier and a number of subcarriers, e.g. a number of 2L, may be calculated.

In the third processing block 403 following the second processing block 402, MMSE filter weights may be calculated, e.g. according to:

$$w=(C+R(0)I)^{-1}r \quad (2)$$

where w is the (2L+1) weights vector, C is the (2L+1)×(2L+1) covariance matrix of the $|Z|^2$ values, r is the autocorrelation vector of the noise samples, and I is a (2L+1)×(2L+1) identity matrix. An optimum length is found to be L=8 (filter length 2L+1=17), which agrees with the correlation properties of WiFi samples as described below with respect to FIG. 7a.

In the fourth processing block 404 following the third processing block 403, an MMSE filter for $|Z|^2$ is applied across every adjacent set of subcarriers, e.g. of length 2L+1. The MMSE algorithm uses the correlation between the $|Z|^2$ values to obtain the filter coefficients that minimize the mean square error. The (MMSE) filtering may be applied to the interference noise powers to estimate the noise variance, e.g. according to $$\sigma = \sum_w w|Z|^2 \quad (3)$$

The second, third and fourth processing blocks 402, 403, 404 may be performed as one processing block. The second, third and fourth processing blocks 402, 403, 404 may be repeated for each subcarrier 405 of the subcarrier-symbol grid and for each symbol 406 of the subcarrier-symbol grid. After the subcarriers loop 405 and the symbols loop 406, a WiFi variance estimate 412 at each LTE RE is obtained. The WiFi variance estimate 412 may be time averaged in a seventh processing block 407 to obtain a WiFi estimate 413 at each LTE subcarrier. The time averaging may be performed by using a sliding window of size "Q" where Q denotes the number of subframes.

A time averaging 407 of variable sliding window (Q) may be applied at the output of the MMSE filter of each subcarrier, to obtain the averaged WiFi variance estimate. A performance evaluation for the values of Q=1 and Q=5 sub-frames and without the time-averaging is presented in table 1.

TABLE 1

Mean Square Error (MSE) for different sliding window sizes (Q)

| MMSE only | MMSE and time-averaging on 1 subframe (Q = 1) | MMSE and time-averaging on 5 subframe (Q = 5) |
| --- | --- | --- |
| 2e–02 | 2e–03 | 9e–04 |

Table 1 shows that the lowest MSE can be achieved when using time-averaging with a sliding window of Q=5 sub-frames.

Figure 5:
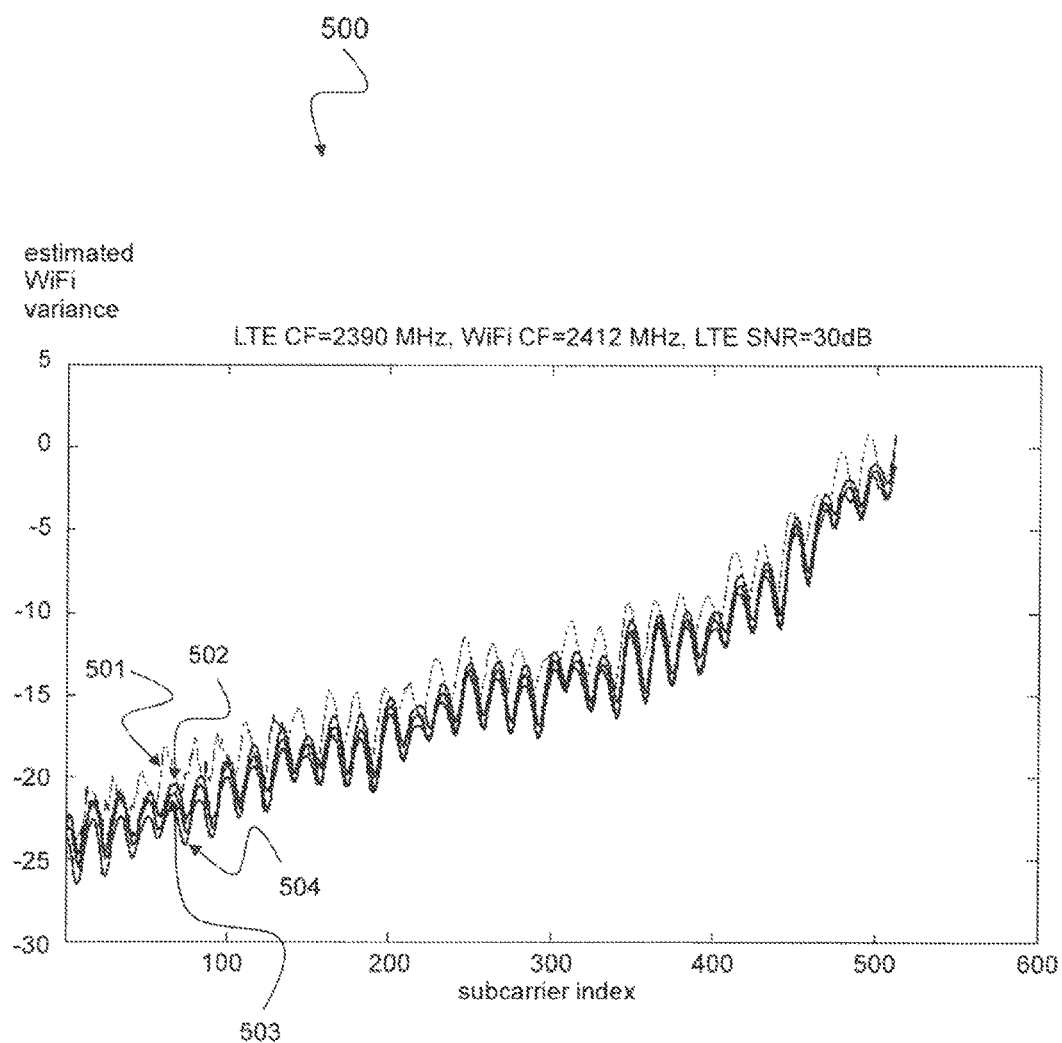
FIG. 5 is a performance diagram 500 of the algorithm 200 for interference variance estimation.

FIG. 5 is a performance diagram 500 of the algorithm 200 for interference variance estimation. FIG. 5 shows the performance of the MMSE and MMSE followed by time averaging algorithms at LTE CF (center frequency)=2390 MHz and WiFi CF=2412 MHz. The MMSE algorithm (curve 501—MMSE only) successfully tracks the WiFi variance (curve 504—actual WiFi variance) but with relatively high mean square error. Since the WiFi variance at each subcarrier is considered a random variable, by averaging in the time domain the expectation of these random variables may be obtained. Therefore, it refines the estimated variance using the MMSE algorithm and a closer estimate for the WiFi variance may be obtained (curve 502—MMSE+time averaging on 1 subframe, Q=1). Using Q=5 estimates the expectation may be performed more accurately (curve 503—MMSE+time averaging on 5 sub-frames, Q=5). So a very low MSE may be obtained as shown above in Table 1.

FIG. 6 is a diagram 600 illustrating an exemplary distribution of the WiFi interference on an LTE subcarrier. A mathematical model for the WiFi interference can be given by $$I_i = \sum_{n=1}^{64} A_n e^{j\theta_n} \frac{\sin(\pi f_i^{(n)}/\Delta f_w)}{\pi f_i^{(n)}/\Delta f_w} \quad (4)$$

where n denotes the WiFi subcarrier index, $A_n$, $\theta_n$ denote the amplitude and phase of the $n^{th}$ WiFi subcarrier (represent the data), $f_i^{(n)}$ denotes the frequency spacing between the $i^{th}$ LTE subcarrier and the $n^{th}$ WiFi subcarrier, and $\Delta f_w$ is the WiFi subcarrier spacing (250 kHz in the example of FIG. 6).

As shown in equation (1), every tone of the WiFi signal produces a sinc signal in the frequency domain with nulls every 250 KHz apart (length of one WiFi symbol in time is considered to be 4 µs), and the interference of this tone on a certain LTE subcarrier is the value of the sinc function at the frequency of this LTE subcarrier. As the WiFi signal according to FIG. 6 is composed of 64 subcarriers, the total interference on one LTE subcarrier may be considered as the sum of the contributions of all these sinc functions. Since the sinc functions are multiplied by random numbers (the WiFi symbols), the interference on the LTE subcarrier is the sum of many random variables and approximates Gaussian by the central limit theorem. A complete WiFi system is described below with respect to FIG. 12. FIG. 6 illustrates the distribution of the interference on some LTE subcarrier as generated by the signal generator of the WiFi path 1201 shown in FIG. 12. As shown, the interference on each LTE subcarrier may be considered as Gaussian with zero mean. The variance of this Gaussian random variable depends on the closeness of the LTE subcarrier under consideration to the WiFi band. The closer to WiFi band is to the LTE subcarrier, the higher is the variance.

FIG. 7a is a diagram 700a illustrating an exemplary correlation of the WiFi interference on LTE subcarriers. According to FIG. 6 it was shown that the WiFi interference can be considered as Gaussian. In the following, the correlation of these Gaussian random variables, i.e. the WiFi interference on all the LTE subcarriers, is studied. Considering a hypothetical single-tone WiFi signal at zero frequency, and the $i^{th}$ LTE subcarrier is at frequency $f_i$ relative to it, the interference on the $i^{th}$ LTE subcarrier can be described as $$I_1 = A_1 e^{j\theta_1} \frac{\sin(\pi f_i^{(n)}/\Delta f_w)}{\pi f_i^{(n)}/\Delta f_w} \quad (5)$$

Letting the normalized frequency $f_i/\Delta f_w = M_i + m_i$ where $M_i$ is the integer part and $m_i$ is the fractional part, and knowing the fact that $f_{i+1} = f_i + 15$ kHz, it can be deduced that $m_{i+1} = \mod(m_i + 0.06, 1)$, $m_{i+50} = m_i$, and $m_{i+50} = M_i + 3$. Moreover, the interference on some frequency is the same as the interference on other frequencies multiple of 250 KHz apart with only scalar multiplication that represents the envelope of the sinc functions. From this discussion, it can be deduced that the WiFi interference on any LTE subcarriers may be considered as totally correlated with the WiFi interference on all subcarriers multiple of 50 subcarrier apart. FIG. 7a shows the correlation coefficient between the WiFi interference on the 1st subcarrier and the interference on the rest of the subcarriers. A first point 701 represents a first measurement at subcarrier 51 with correlation coefficient approximately 1.0. A second point 702 represents a second measurement at subcarrier 101 with correlation coefficient approximately 1.0.

Figure 7B:
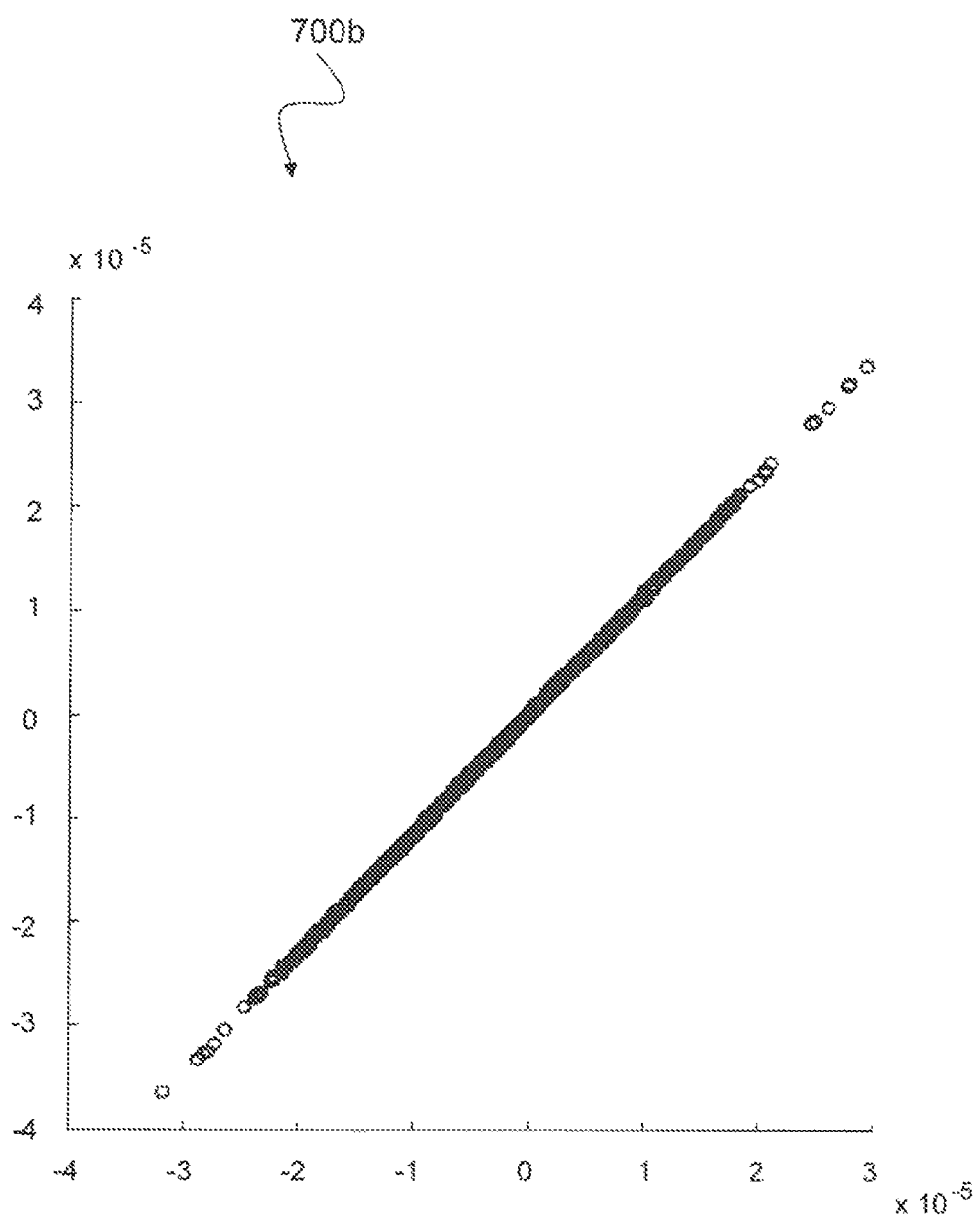
FIG. 7b is a diagram 700b illustrating an exemplary correlation coefficient (real part) of the WiFi interference on LTE subcarriers.
Figure 7C:
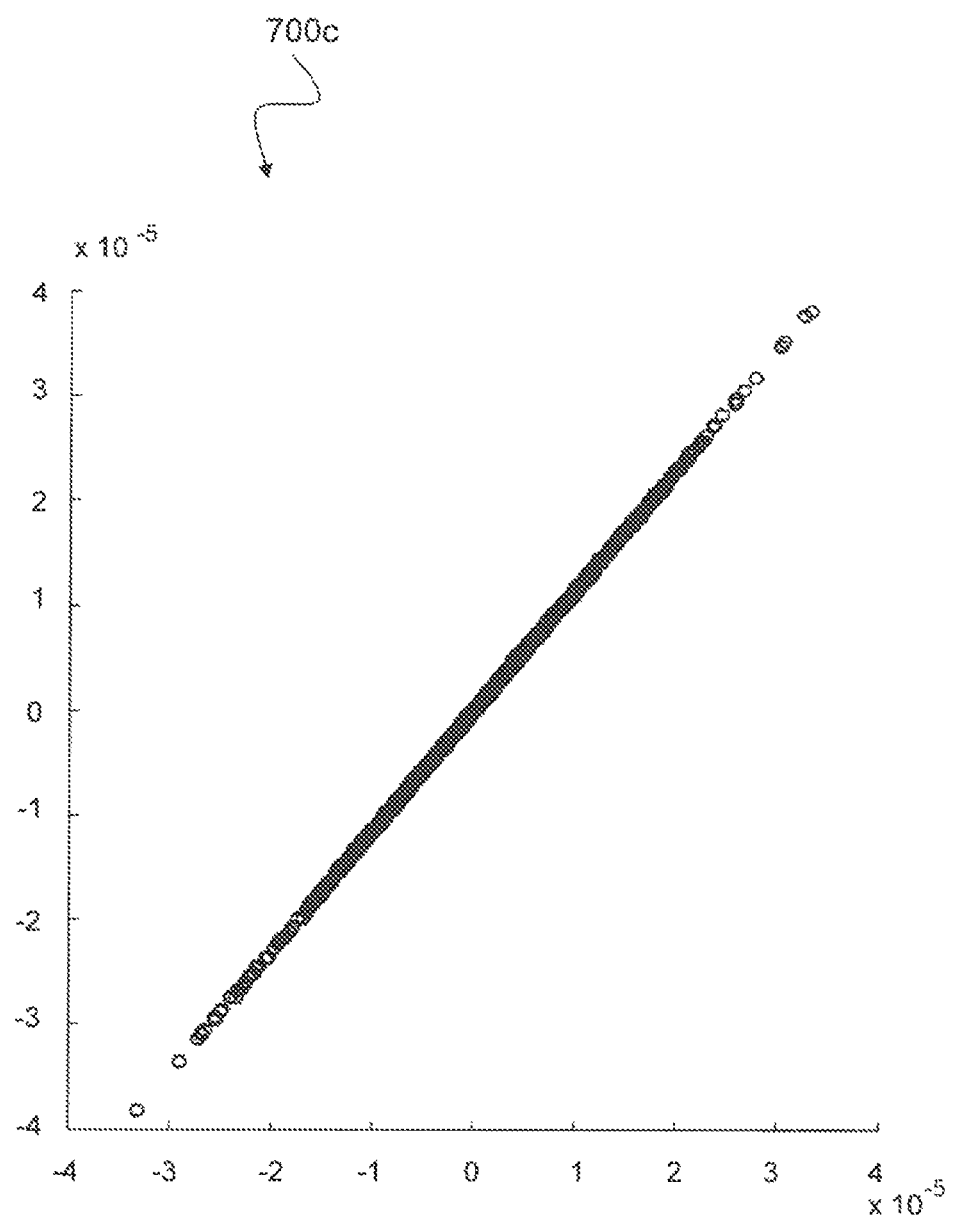
FIG. 7c is a diagram 700c illustrating an exemplary correlation coefficient (imaginary part) of the WiFi interference on LTE subcarriers.

FIGS. 7b and 7c are diagrams 700b, 700c illustrating an exemplary correlation coefficient (real part, 700b and imaginary part, 700c) of the WiFi interference on LTE subcarriers. The Figures show scatter plots of the WiFi interference on the first and the 51st LTE subcarrier (real part 700b and imaginary part 700c). It can be seen from the plots that the correlation coefficient is nearly one according to a straight line.

Figure 8:
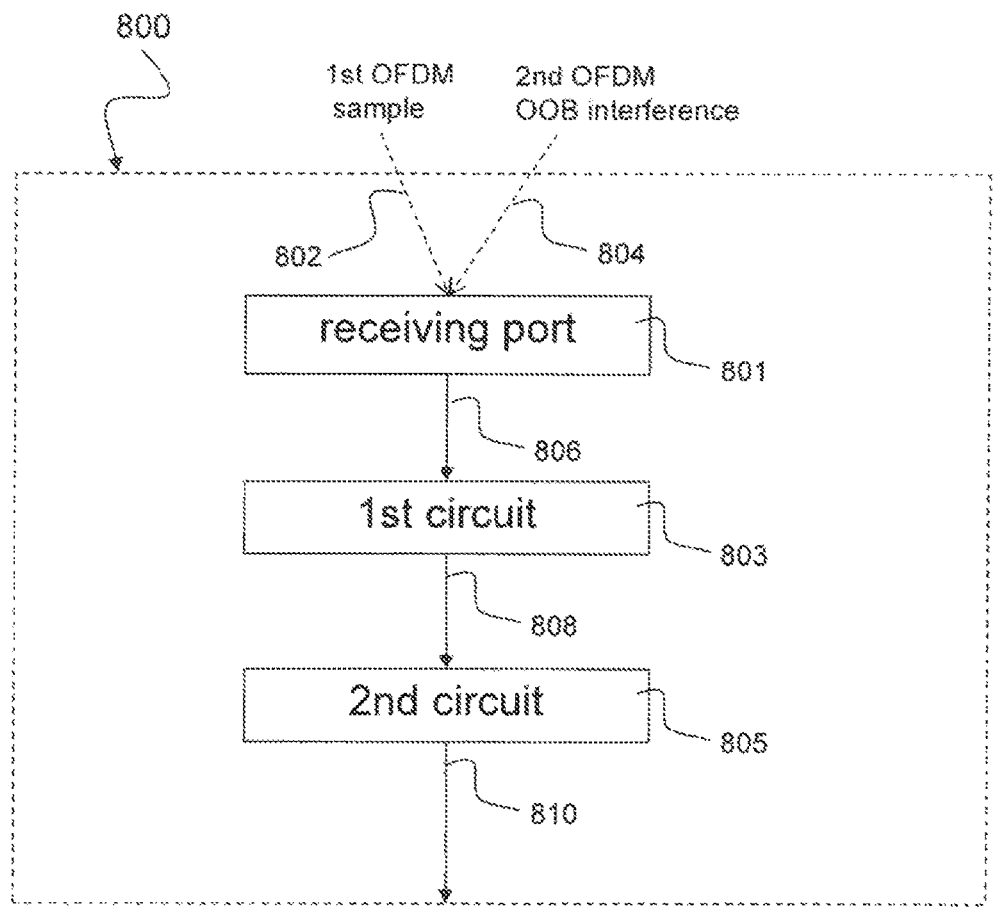
FIG. 8 is a schematic diagram of an interference variance estimator 800 in accordance with the disclosure.

FIG. 8 is a schematic diagram of an interference variance estimator 800 in accordance with the disclosure. The interference variance estimator 800 includes a receiving port 801, a first circuit 803 and a second circuit 805. The receiving port 801 is configured to receive a composite sample 806 comprising a sample 802 of a first OFDM transmission scheme, e.g. LTE, interfered by out-of-band interference 804 of a second OFDM transmission scheme, e.g. WiFi. The first OFDM transmission scheme includes a plurality of resource elements arranged in a symbol-subcarrier grid, e.g. according to the illustration of FIG. 2. The first circuit 803 is configured to determine for each of the resource elements a power estimate 808 of the out-of-band interference. The second circuit 805 is configured to filter the power estimates 808 over subcarriers corresponding to a same symbol of the grid to obtain the interference variance 810. Weights of the filtering are based on a correlation property of the power estimates with respect to the subcarriers. The second circuit 805 may include an MMSE filter to filter the power estimates. The interference variance estimator 800 may perform the method 300 and the algorithm 400 as described above with respect to FIGS. 3 and 4.

Figure 9:
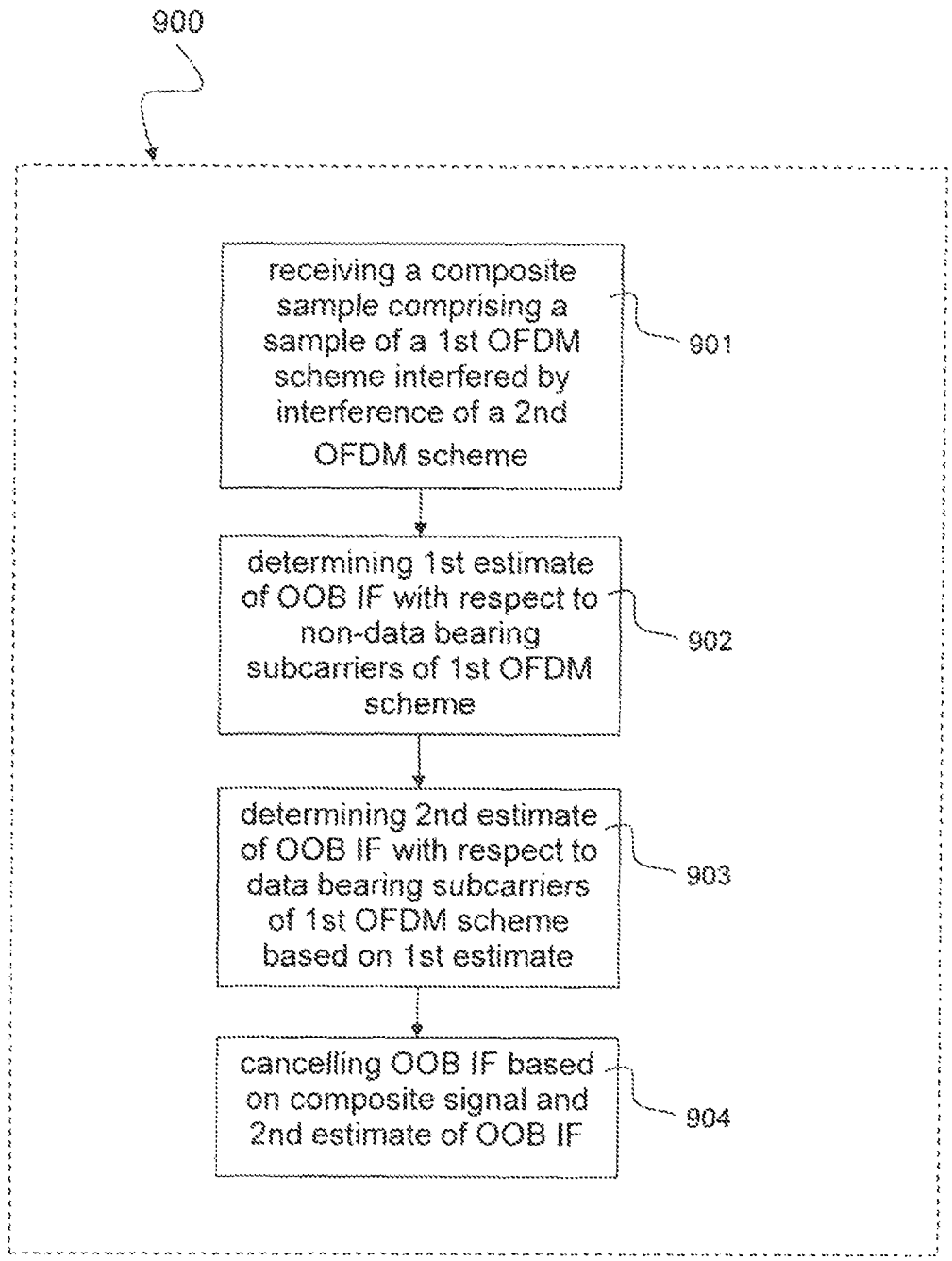
FIG. 9 is a schematic diagram of a method 900 for interference cancellation in accordance with the disclosure.

FIG. 9 is a schematic diagram of a method 900 for interference cancellation in accordance with the disclosure. The interference cancellation method 900 includes receiving 901 a composite sample comprising a sample of a first OFDM transmission scheme interfered by out-of-band interference of a second OFDM transmission scheme. The first OFDM transmission scheme comprises a plurality of resource elements arranged in a symbol-subcarrier grid. The subcarriers are partitioned into non-data bearing subcarriers and data bearing subcarriers. The interference cancellation method 900 includes determining 902 a first estimate of the out-of-band interference with respect to the non-data bearing subcarriers. The interference cancellation method 900 includes determining 903 a second estimate of the out-of-band interference with respect to the data bearing subcarriers based on the first estimate. The interference cancellation method 900 further includes cancelling 904 the out-of-band interference based on the composite signal and the second estimate.

The first OFDM transmission scheme may include an LTE transmission scheme and the second OFDM transmission scheme may include a WiFi transmission scheme. The determining 902 the first estimate of the out-of-band interference may be performed by using an MMSE-based estimator. The determining 903 the second estimate of the out-of-band interference may be performed by using a correlation property between the non-data bearing subcarriers and the data bearing subcarriers. The determining 903 the second estimate of the OOB interference may be based on a scaling of the first estimate of the OOB interference. The scaling may be with a scaling factor corresponding to a variance of the OOB interference at the data bearing subcarriers. The method 900 may further include estimating the variance of the out-of-band interference at the data bearing subcarriers. The estimating the variance of the out-of-band interference may include determining for each of the resource elements a corresponding power estimate of the out-of-band interference; estimating the variance at a resource element based on filtering the power estimates over subcarriers of the grid which correspond to a same symbol of the grid; and adjusting weights of the filtering based on a correlation property of the power estimates with respect to the subcarriers. The method 900 may further include cancelling the out-of-band interference based on a subtraction of the second estimate of the out-of-band interference from the composite signal.

The method 900 may be implemented by a DSP-based WiFi self-interference cancellation (IC) algorithm, e.g. as described below with respect to FIG. 10. This algorithm may significantly reduce the impact of the WiFi interference on the LTE receiver. It has turned out that the WiFi OOB self-interference on the LTE subcarriers can be considered as zero-mean Gaussian random variables with a variable variance (with decreasing value as a distance of the LTE subcarriers to the WiFi ISM band increases). Moreover, the WiFi OOB interference across specific subcarriers may experience perfect (or nearly perfect) correlation. Such perfect correlation may be used to estimate the WiFi signal across the LTE null tones, i.e. the tones including only noisy WiFi signals but no data.

An optimal MMSE-based estimator may be used to estimate the WiFi signal. The estimated WiFi signal may be subtracted, e.g. after scaling its variance, from the corresponding perfectly-correlated LTE data-bearing subcarrier to obtain an estimate of the LTE data.

Figure 10:
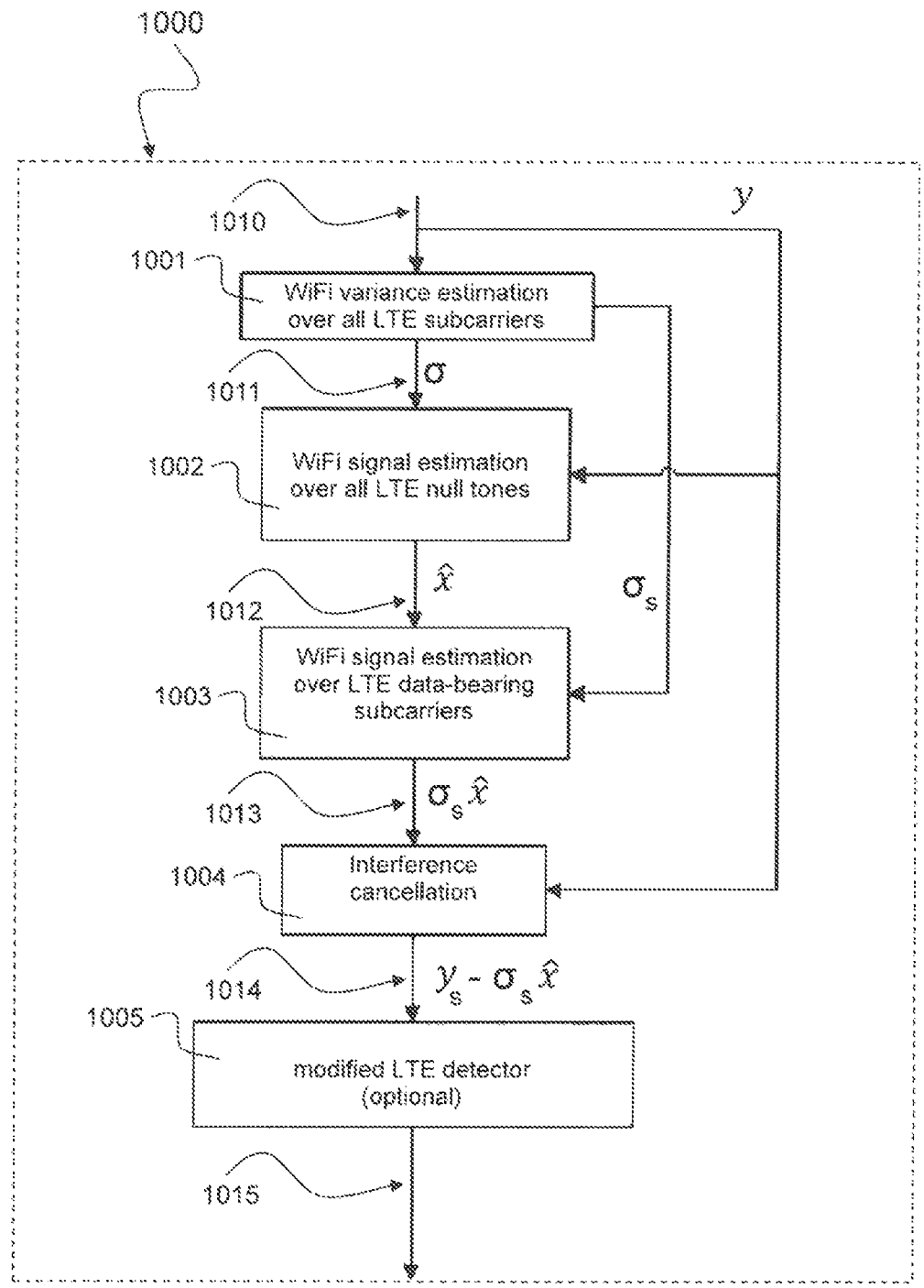
FIG. 10 is a flow chart illustrating an algorithm 1000 for interference cancellation in accordance with the disclosure.

FIG. 10 is a flow chart illustrating an algorithm 1000 for interference cancellation in accordance with the disclosure. It is described above with respect to FIG. 6 that the WiFi OOB self-interference may be considered as Gaussian with zero-mean and varying variance. Moreover, it is described above with respect to FIG. 7a that the WiFi samples across the sub-carriers are correlated with a correlation factor ranging from zero to about 1. The interference cancellation algorithm 1000 can be described by using the flow chart of FIG. 10.

The algorithm 1000 may include a first processing block 1001 receiving the LTE subcarriers with WiFi interference, i.e. the noisy composite sample 1010 or samples respectively which may include the LTE sample, the WiFi interference and the noise, e.g. as described above with respect to FIG. 4.

In the first processing block 1001, the WiFi variance estimation may be performed over all LTE subcarriers. The estimation of the WiFi variance 1011 $\sigma^2$ can be done using multiple frequency-domain and time domain techniques such as MMSE-based and averaging. The first processing block 1001 may implement the interference variance estimation algorithm 400 as described above with respect to FIG. 4 or the method 300 as described above with respect to FIG. 3.

Once the WiFi variances $\sigma^2$ over all subcarriers are estimated, the WiFi signal may be estimated over the null tones using an optimal MMSE-based estimator as implemented by the second processing block 1002. The estimation process can be described as follows. It is assumed that the number of the null tones which are perfectly (or nearly perfectly) correlated with each other is n. The received signal on these null tones can be written as $$y = \sigma x + z \qquad (6)$$

Where $\sigma = [\sigma_1 \ldots \sigma_n]^T$ is the standard deviation of the WiFi interference on the correlated subcarriers, x is N(0,1), i.e. Gaussian distribution with zero mean and variance 1, z is complex AWGN N(0, N$_0$), i.e. Gaussian distribution with zero mean and variance N$_0$. Since x is a Gaussian random variable and y is a Gaussian random vector, the MMSE estimate of x is linear and is equal to $$\hat{x} = E\{x|y\} = \Sigma_{xy}\Sigma_y^{-1} y \qquad (7)$$

where $\Sigma_{xy} = E\{xy^T\} = \sigma^T$ and $\Sigma_y = E\{yy^T\} = \sigma\sigma^T + N_0 I$.

Once the WiFi signal 1012 is estimated over the null tones in the second processing block 1002, in the third processing block 1003 the WiFi signal 1013 is estimated over the LTE data bearing subcarrier which is correlated with those null tones, by scaling the estimated WiFi signal 1012 as $\sigma_s \hat{x}$, where $\sigma_s$ is the standard deviation of the WiFi signal at the data-bearing subcarrier as estimated by the first processing block 1001.

Once the WiFi signal 1013 is estimated in the third processing block 1003, in the fourth processing block 1004 the WiFi signal 1013 is subtracted from the received signal, i.e. the LTE sample interfered by WiFi interference and noise. The output 1014 is $y_s - \sigma_s \hat{x}$, where $y_s$ is the received signal on the data bearing subcarrier.

The fifth processing block 1005 may implement an optional improvement to the interference cancelled signal 1014. A modified LTE detector may be applied on the residual signal (LTE+noise+estimation error) 1014, taking into consideration that the estimation error is also Gaussian with variance $\sigma^2 \Sigma_{xy} \Sigma_y^{-1} \Sigma_{xy}^T$. The MMSE detector coefficients are equal to:

$$W_{mmse} = (H^H R^{-1} H + I)^{-1} H^H R^{-1} \qquad (8)$$

where H is the LTE channel matrix and R is the additive noise covariance matrix which is in the fifth processing block 1005 modified to be $N_0 + \sigma_s^2 \Sigma_{xy} \Sigma_y^{-1} \Sigma_{xy}^T)I$. The enhanced interference cancelled signal 1015 may be obtained.

Figure 11A:
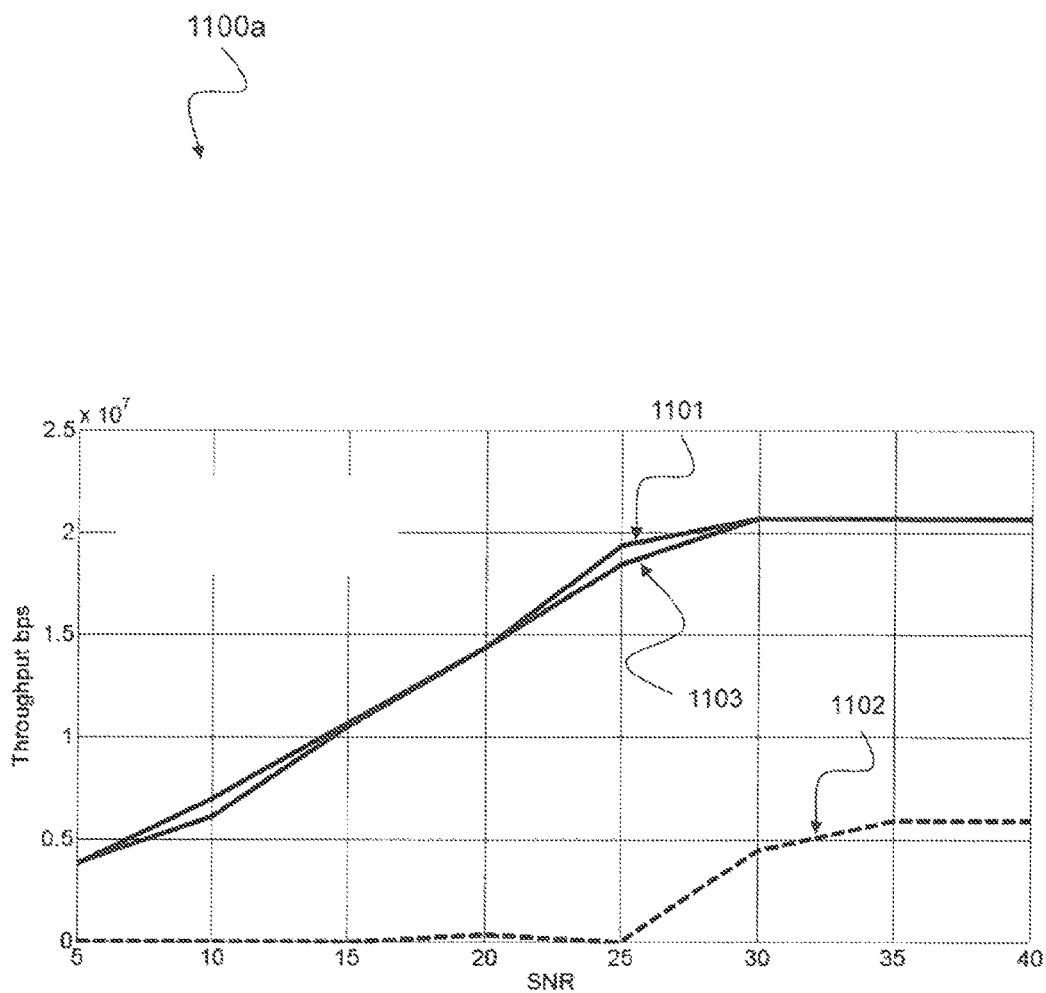
FIG. 11a is a performance diagram 1100a of the algorithm 900 for interference cancellation illustrating throughput over SNR at an LTE center frequency of 2390 MHz.

FIG. 11a is a performance diagram 1100a of the algorithm 900 for interference cancellation illustrating throughput over SNR at an LTE center frequency of 2390 MHz. An LTE/WiFi platform was set up according to the block diagram in FIG. 13. FIG. 11a shows the throughput curves of the LTE system with center frequency of 2390 MHz and bandwidth of 5 MHz (assuming perfect knowledge of $\sigma$ and $\sigma_s$). The first curve 1101 depicts the throughput without WiFi interference (i.e. the reference curve). The second curve 1102 depicts the throughput before WiFi interference cancellation. The third curve 1103 depicts the throughput after WiFi interference cancellation. As shown, the algorithm 900 significantly improves the performance of the LTE throughput. The performance is close to the ideal case with no WiFi interference.

Figure 11B:
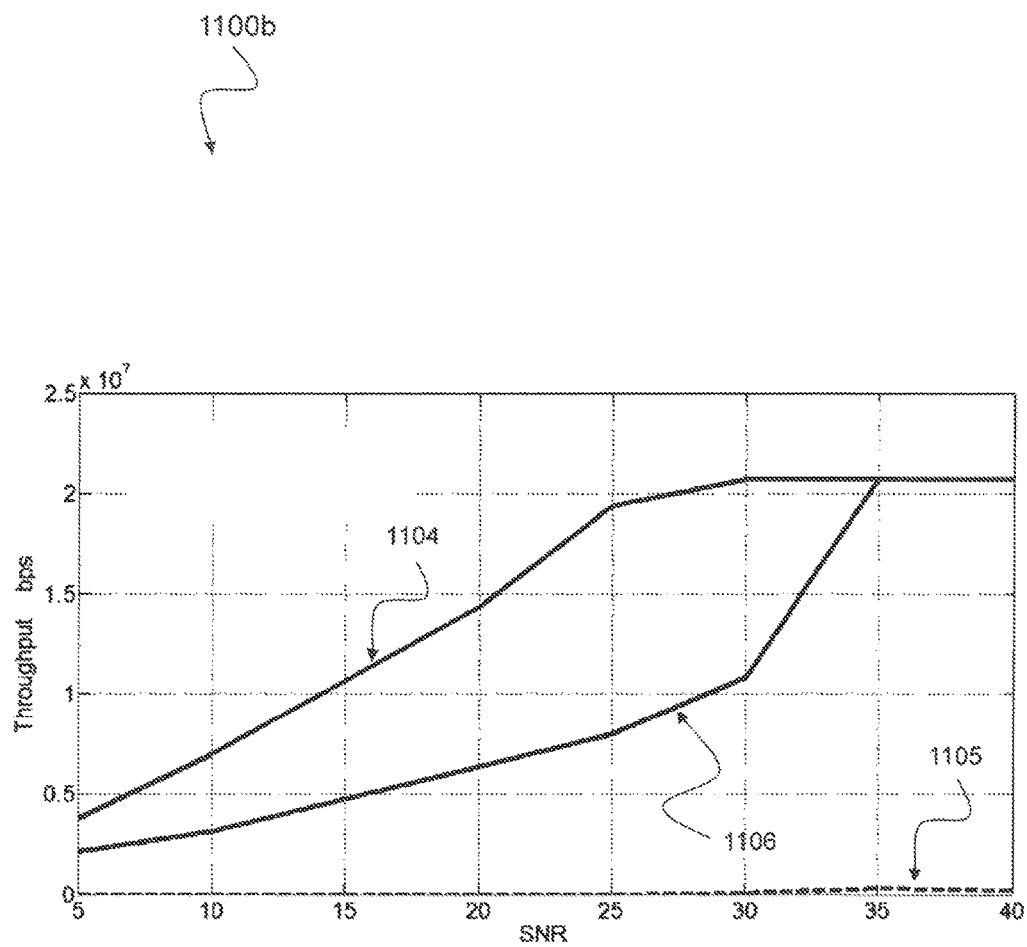
FIG. 11b is a performance diagram 1100b of the algorithm 900 for interference cancellation illustrating throughput over SNR at an LTE center frequency of 2392.5 MHz.

FIG. 11b is a performance diagram 1100b of the algorithm 900 for interference cancellation illustrating throughput over SNR at an LTE center frequency of 2392.5 MHz.

The first curve 1104 depicts the throughput without WiFi interference. The second curve 1105 depicts the throughput before WiFi interference cancellation. The third curve 1106 depicts the throughput after WiFi interference cancellation. It can be seen from the curves that by applying the algorithm 900, the performance of the LTE throughput compared to the zero-throughput baseline case (IC algorithm not implemented) can be significantly improved.

Figure 11C:
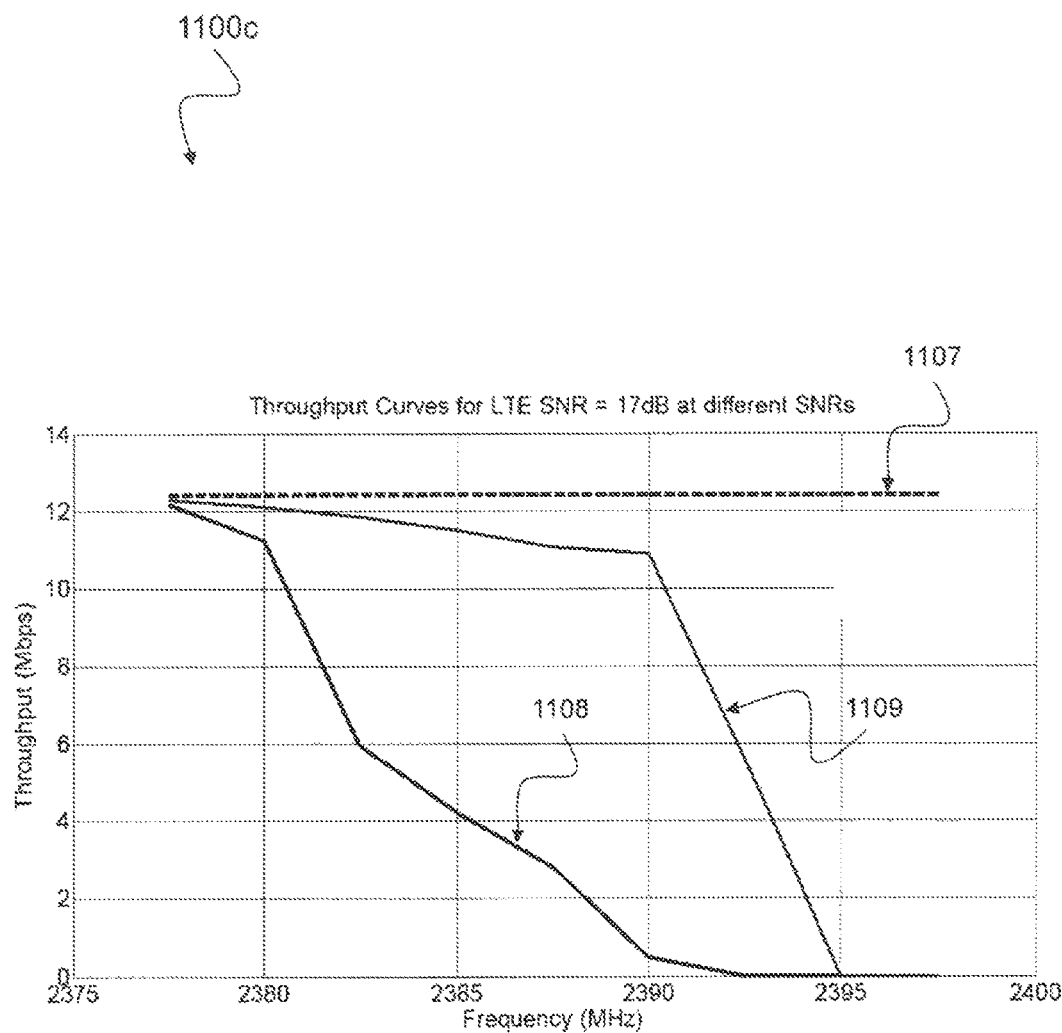
FIG. 11c is a performance diagram 1100c of the algorithm 900 for interference cancellation illustrating throughput over frequency at an LTE center frequency of 2390 MHz for a SNR of 17 dB.

FIG. 11c is a performance diagram 1100c of the algorithm 900 for interference cancellation illustrating throughput over frequency at an LTE center frequency of 2390 MHz at LTE SNR=17 dB. The first curve 1107 depicts the throughput without WiFi interference. The second curve 1108 depicts the throughput before WiFi interference cancellation. The third curve 1109 depicts the throughput after WiFi interference cancellation. It can be seen from the curves that by applying the algorithm 900, the baseline case at different center frequency values can be significantly improved.

Figure 12:
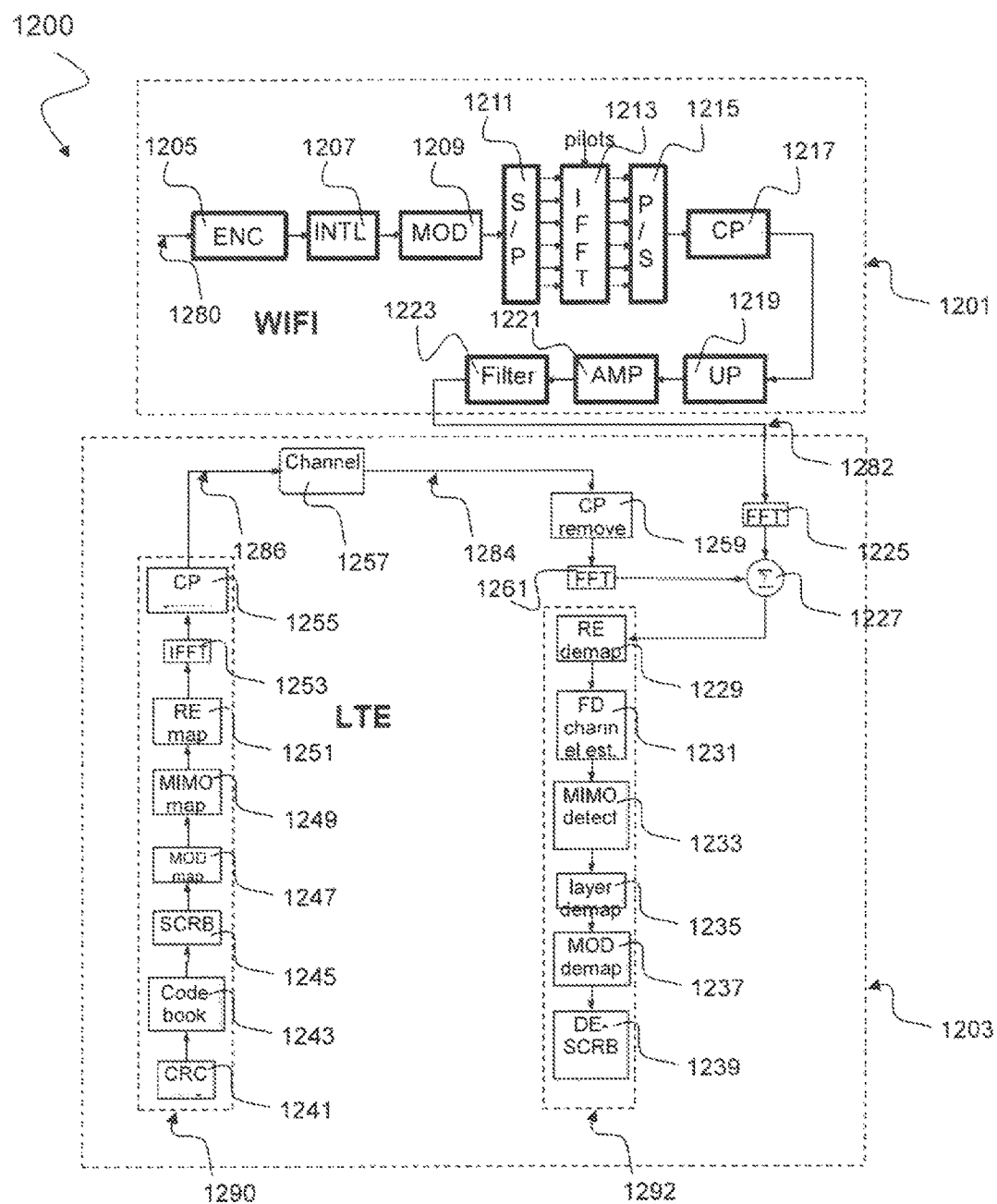
FIG. 12 is a block diagram of a WiFi-LTE transmission system 1200 in accordance with the disclosure.

FIG. 12 is a block diagram of a WiFi-LTE transmission system 1200 in accordance with the disclosure. The system 1200 includes a WiFi transmitter chain 1201 and an LTE transmitter/receiver chain 1203. The WiFi transmitter chain 1201 includes a convolutional encoder 1205, e.g. of rate (1/2, 2/3, 3/4) to encode an input signal 1280. The encoded input signal passes an interleaver 1207, a modulation mapper 1209 implementing one of a BPSK, QPSK, 16-QAM and 64-QAM modulation, a serial-to-parallel converter 1211, an IFFT 1213, e.g. 64-IFFT, a parallel-to-serial converter 1215, a cyclic prefixing unit, e.g. of length 16, an up-sampling unit 1219, a power amplifier 1221 and a spectral masking/filtering unit 1223, thereby coding the input signal 1180 to become a WiFi signal 1282 that is transmitted to the LTE transmitter/receiver chain 1203. The LTE transmitter/receiver chain 1203 includes an LTE transmitter chain 1290, an LTE receiver chain 1292, a channel 1257 and further processing units.

In the LTE transmitter/receiver chain 1203 a frequency-domain addition 1227 is performed with the WiFi signal 1282 after having passed an FFT block 1225 and with an LTE receive signal 1284 from which a cyclic prefix has been removed by a CP removal unit 1259 and which has passed another FFT block 1261. The resulting signal is passed to an LTE receiver chain 1292.

The LTE transmitter chain 1290 includes a CRC and channel coding unit 1241, a code-block concatenation 1243, a scrambling unit 1245, a modulation mapper 1247, a MIMO layer mapping/precoding unit 1249, a resource element mapper 1251, an IFFT 1253 and a cyclic prefixing and signal generation unit 1255 to generate an LTE transmit signal 1286. The LTE transmit signal 1286 passes the channel 1257 to obtain the LTE receive signal 1284.

The LTE receiver chain 1292 includes a resource element demapper 1229, a frequency domain channel estimation unit 1231, a MIMO detection unit 1233 that may using the MMSE algorithm, a layer de-mapper 1235, a modulation demapper 1237 and a descrambling and channel decoding unit 1239 to produce an estimate of the input signal 1280. The MIMO detection unit 1233 may implement the algorithm 1000 as described above with respect to FIG. 10 or the method 900 as described above with respect to FIG. 9.

Figure 13:
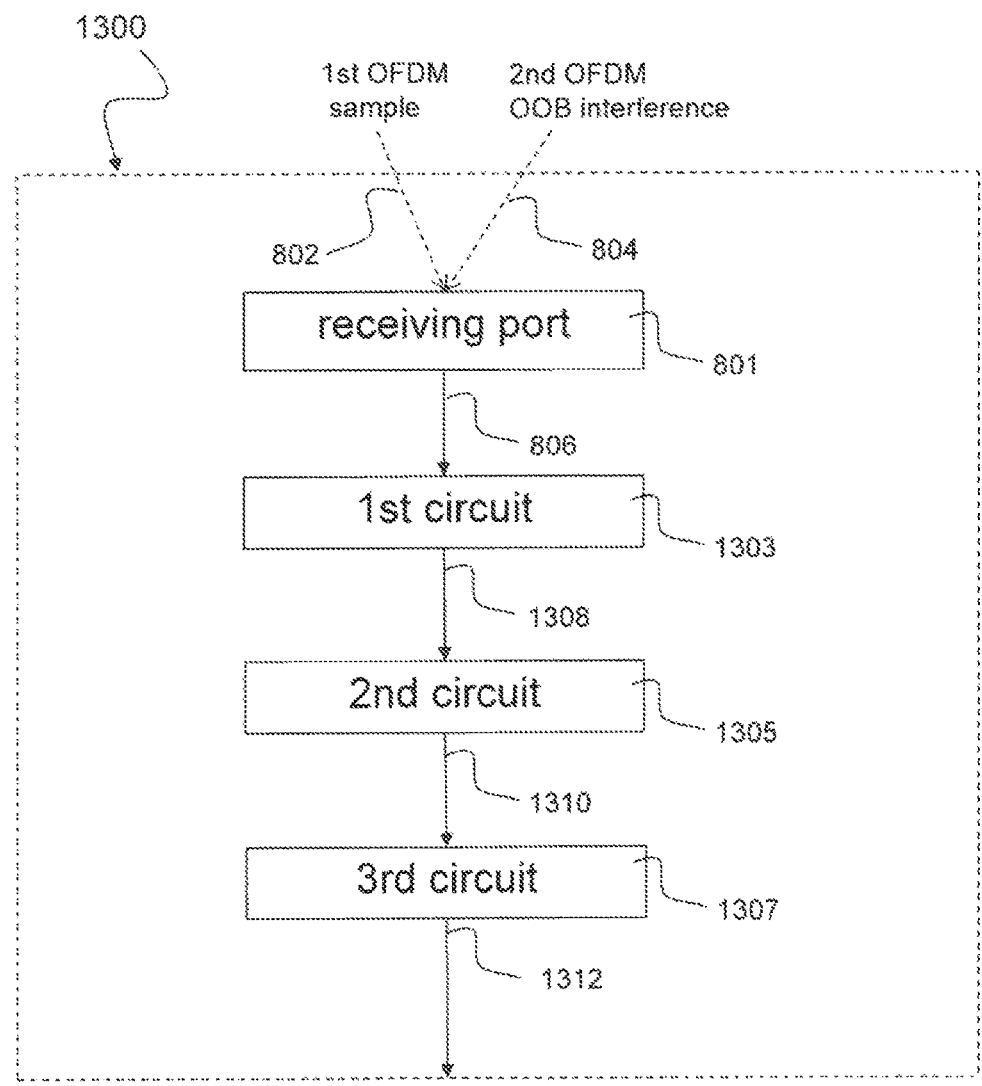
FIG. 13 is a schematic diagram of an interference canceller 1300 in accordance with the disclosure.

FIG. 13 is a schematic diagram of an interference canceller 1300 in accordance with the disclosure. The interference canceller includes a receiving port 801, a first circuit 1303, a second circuit 1305 and a third circuit 1307.

The receiving port 801 may correspond to the receiving port 801 described above with respect to FIG. 8. The receiving port 801 is configured to receive a composite sample 806 comprising a sample 802 of a first OFDM transmission scheme, e.g. LTE, interfered by out-of-band interference 804 of a second OFDM transmission scheme, e.g. WiFi. The first OFDM transmission scheme includes a plurality of resource elements arranged in a symbol-subcarrier grid. The subcarriers are partitioned into non-data bearing subcarriers and data bearing subcarriers. The first circuit 1303 is configured to determine a first estimate 1308 of the out-of-band interference with respect to the non-data bearing subcarriers. The second circuit 1305 is configured to determine a second estimate 1310 of the out-of-band interference with respect to the data bearing subcarriers based on the first estimate. The third circuit 1307 is configured to cancel the out-of-band interference based on the composite signal 806 and the second estimate 1310 to obtain an interference cancelled signal 1312.

The first circuit 1303 may include an MMSE filter configured to determine the first estimate 1308. The second circuit 1305 may be configured to determine the second estimate 1310 based on a scaling of the first estimate 1308 with a variance of the out-of-band interference at the data bearing subcarriers.

The interference canceller 1300 may perform the method 900 and the algorithm 1000 as described above with respect to FIGS. 9 and 10.

EXAMPLES

The following examples pertain to further embodiments. Example 1 is an interference variance estimation method, comprising: receiving a composite sample comprising a sample of a first OFDM transmission scheme interfered by out-of-band interference of a second OFDM transmission scheme, the first OFDM transmission scheme comprising a plurality of resource elements arranged in a symbol-subcarrier grid; determining, for each of the plurality of resource elements, a power estimate of the out-of-band interference; and filtering the plurality of power estimates over a plurality of subcarriers corresponding to a same symbol of the symbol-subcarrier grid to obtain the interference variance, wherein the filtering comprises filtering weights based on a correlation property of the plurality of power estimates according to the plurality of subcarriers.

In Example 2, the subject matter of Example 1 can optionally include that the first OFDM transmission scheme comprises a cellular transmission scheme, in particular an LTE transmission scheme and that the second OFDM transmission scheme comprises a wireless network transmission scheme, in particular a WiFi transmission scheme.

In Example 3, the subject matter of any one of Examples 1-2 can optionally include estimating the interference variance at a particular subcarrier based on time-averaging the interference variance of the particular subcarrier over a plurality of symbols of the grid.

In Example 4, the subject matter of Example 3 can optionally include: time-averaging the interference variance based on a sliding window.

In Example 5, the subject matter of any one of Examples 1-4 can optionally include filtering the plurality of power estimates over a plurality of adjacent sets of subcarriers of the grid.

In Example 6, the subject matter of any one of Examples 1-5 can optionally include determining the weights of the filtering based on an MMSE algorithm.

In Example 7, the subject matter of any one of Examples 1-6 can optionally include filtering the plurality of power estimates, in particular by using a filter length of 17.

In Example 8, the subject matter of any one of Examples 1-7 can optionally include determining a hypothesis of the sample of the first OFDM transmission scheme based on a distance between the composite sample and a set of modulation symbols of the first OFDM transmission scheme.

In Example 9, the subject matter of Examples 8 can optionally include determining for each of the resource elements the power estimate of the out-of-band interference based on the received composite sample, the hypothesis of the sample of the first OFDM transmission scheme and an estimated channel.

In Example 10, the subject matter of any one of Examples 1-9 can optionally include that a correlation coefficient (700a) of power estimates corresponding to a predetermined subcarrier distance, in particular a subcarrier distance of 50, is near about 1.

In Example 11, the subject matter of any one of Examples 1-10 can optionally include that a distribution of the out-of-band interference on each subcarrier of the first OFDM transmission scheme is Gaussian with zero mean.

Example 12 is an interference cancellation method, comprising: receiving a composite sample comprising a sample of a first OFDM transmission scheme interfered by out-of-band interference of a second OFDM transmission scheme, the first OFDM transmission scheme comprising a plurality of resource elements arranged in a symbol-subcarrier grid, wherein a plurality of subcarriers are partitioned into a plurality of non-data bearing subcarriers and a plurality of data bearing subcarriers; determining a first estimate of the out-of-band interference according to the plurality of non-data bearing subcarriers; determining a second estimate of the out-of-band interference according to the plurality of data bearing subcarriers based on the first estimate; and cancelling the out-of-band interference based on the composite signal and the second estimate.

In Example 13, the subject matter of Example 12 can optionally include that the first OFDM transmission scheme comprises a cellular transmission scheme, in particular an LTE transmission scheme; and that the second OFDM transmission scheme comprises a wireless network transmission scheme, in particular a WiFi transmission scheme.

In Example 14, the subject matter of any one of Examples 12-13 can optionally include determining the first estimate of the out-of-band interference by using an MMSE-based estimator.

In Example 15, the subject matter of any one of Examples 12-14 can optionally include determining the second estimate of the out-of-band interference by using a correlation property between the plurality of non-data bearing subcarriers and the plurality of data bearing subcarriers.

In Example 16, the subject matter of any one of Examples 12-15 can optionally include determining the second estimate of the out-of-band interference based on a scaling of the first estimate of the out-of-band interference.

In Example 17, the subject matter of Examples 16 can optionally include scaling the first estimate of the out-of-band interference with a variance of the out-of-band interference at the plurality of data bearing subcarriers.

In Example 18, the subject matter of Example 17 can optionally include estimating the variance of the out-of-band interference at the plurality of data bearing subcarriers.

In Example 19, the subject matter of Example 18 can optionally include that estimating the variance of the out-of-band interference comprises: determining for each of the plurality of resource elements a corresponding power estimate of the out-of-band interference; estimating the variance at a resource element based on filtering the plurality of power estimates over subcarriers of the grid which of the plurality of subcarriers correspond to a same symbol of the grid; and adjusting weights of the filtering based on a correlation property of the plurality of power estimates according to the subcarriers.

In Example 20, the subject matter of any one of Examples 12-19 can optionally include cancelling the out-of-band interference based on a subtraction of the second estimate of the out-of-band interference from the composite signal.

Example 21 is an interference variance estimator, comprising: a receiving port configured to receive a composite sample comprising a sample of a first OFDM transmission scheme interfered by out-of-band interference of a second OFDM transmission scheme, the first OFDM transmission scheme comprising a plurality of resource elements arranged in a symbol-subcarrier grid; a first circuit configured to determine for each of the resource elements a power estimate of the out-of-band interference; and a second circuit configured to filter a plurality of power estimates over subcarriers corresponding to a same symbol of the grid to obtain the interference variance, wherein weights of the filtering are based on a correlation property of the plurality of power estimates according to the subcarriers.

In Example 22, the subject matter of Example 21 can optionally include that the second circuit comprises an MMSE filter configured to filter the power estimates.

Example 23 is an interference canceller, comprising: a receiving port configured to receive a composite sample comprising a sample of a first OFDM transmission scheme interfered by out-of-band interference of a second OFDM transmission scheme, the first OFDM transmission scheme comprising a plurality of resource elements arranged in a symbol-subcarrier grid, wherein the subcarriers are partitioned into a plurality of non-data bearing subcarriers and a plurality of data bearing subcarriers; a first circuit configured to determine a first estimate of the out-of-band interference according to the plurality of non-data bearing subcarriers; a second circuit configured to determine a second estimate of the out-of-band interference according to the plurality of data bearing subcarriers based on the first estimate; and a third circuit configured to cancel the out-of-band interference based on the composite signal and the second estimate.

In Example 24, the subject matter of Example 23 can optionally include that the first circuit comprises an MMSE filter configured to determine the first estimate.

In Example 25, the subject matter of any one of Examples 23-24 can optionally include that the second circuit is configured to determine the second estimate based on a scaling of the first estimate with a variance of the out-of-band interference at the plurality of data bearing subcarriers.

Example 26 is a computer readable medium on which computer instructions are stored which when executed by a computer, cause the computer to perform the method of one of Examples 1 to 20.

Example 27 is an interference variance estimator, comprising: receiving means for receiving a composite sample comprising a sample of a first OFDM transmission scheme interfered by out-of-band interference of a second OFDM transmission scheme, the first OFDM transmission scheme comprising a plurality of resource elements arranged in a symbol-subcarrier grid; determining means for determining for each of the resource elements a power estimate of the out-of-band interference; and filtering means for filtering the power estimates over subcarriers corresponding to a same symbol of the grid to obtain the interference variance, wherein weights of the filtering are based on a correlation property of the power estimates with respect to the subcarriers.

In Example 28, the subject matter of Example 27 can optionally include that the first OFDM transmission scheme comprises an LTE transmission scheme and that the second OFDM transmission scheme comprises a WiFi transmission scheme.

In Example 29, the subject matter of any one of Examples 27-28 can optionally include estimating means for estimating the interference variance at a particular subcarrier based on time-averaging the interference variance of the particular subcarrier over symbols of the grid.

Example 30 is an interference canceller, comprising: receiving means for receiving a composite sample comprising a sample of a first OFDM transmission scheme interfered by out-of-band interference of a second OFDM transmission scheme, the first OFDM transmission scheme comprising a plurality of resource elements arranged in a symbol-subcarrier grid, wherein the subcarriers are partitioned into non-data bearing subcarriers and data bearing subcarriers; determining means for determining a first estimate of the out-of-band interference with respect to the non-data bearing subcarriers; determining means for determining a second estimate of the out-of-band interference with respect to the data bearing subcarriers based on the first estimate; and cancelling means for cancelling the out-of-band interference based on the composite signal and the second estimate.

In Example 31, the subject matter of Example 30 can optionally include that the first OFDM transmission scheme comprises an LTE transmission scheme; and that the second OFDM transmission scheme comprises a WiFi transmission scheme.

In Example 32, the subject matter of any one of Examples 30-31 can optionally include an MMSE-based estimator for determining the first estimate of the out-of-band interference.

Example 33 is a transmission system, comprising: an OFDM transmitter and an OFDM receiver, wherein the OFDM receiver comprises an interference canceller according to any one of Examples 23-25.

In Example 34, the subject matter of Example 33 can optionally include that the OFDM receiver is configured to process an OFDM receive symbol received at the receive port in response to an OFDM transmit symbol transmitted at the OFDM transmitter.

Example 35 is a transmission system, comprising: an OFDM transmitter and an OFDM receiver, wherein the OFDM receiver comprises an interference variance estimator according to any one of Examples 21-22.

In Example 36, the subject matter of Example 35 can optionally include that the OFDM receiver is configured to process an OFDM receive symbol received at the receive port in response to an OFDM transmit symbol transmitted at the OFDM transmitter.

In addition, while a particular feature or aspect of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Furthermore, it is understood that aspects of the disclosure may be implemented in discrete circuits, partially integrated circuits or fully integrated circuits or programming means. Also, the terms "exemplary", "for example" and "e.g." are merely meant as an example, rather than the best or optimal.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

The invention claimed is:

1. An interference variance estimation method, comprising:
receiving a composite sample comprising a sample of a first Orthogonal Frequency Division Multiplexing (OFDM) transmission scheme interfered by an out-of-band interference of a second OFDM transmission scheme different from the first OFDM transmission scheme, the first OFDM transmission scheme comprising a plurality of resource elements arranged in a symbol-subcarrier grid;
determining, for each of the plurality of resource elements, a power estimate of the out-of-band interference; and
filtering the plurality of power estimates over a plurality of subcarriers corresponding to a same symbol of the symbol-subcarrier grid to obtain the interference variance, the filtering being performed by using a filter length corresponding to correlation properties of samples of the second OFDM transmission scheme,
wherein weights of the filtering are based on a correlation property of the plurality of power estimates with respect to the plurality of subcarriers.

2. The method of claim 1,
wherein the first OFDM transmission scheme comprises a cellular transmission scheme; and
wherein the second OFDM transmission scheme comprises a wireless network transmission scheme.

3. The method of claim 1, comprising:
time-averaging the interference variance of a particular subcarrier over a plurality of symbols of the symbol-subcarrier grid to obtain an estimate of the interference variance for the particular subcarrier.

4. The method of claim 3, comprising:
time-averaging the interference variance based on a sliding window.

5. The method of claim 1, comprising:
filtering the plurality of power estimates over a plurality of adjacent sets of subcarriers of the symbol-subcarrier grid.

6. The method of claim 1, comprising:
determining the weights of the filtering based on an Minimum Mean Square Error (MMSE) algorithm.

7. The method of claim 1, comprising:
determining a hypothesis of the sample of the first OFDM transmission scheme based on a distance between the composite sample and a set of modulation symbols of the first OFDM transmission scheme.

8. The method of claim 7, comprising:
determining for each of the resource elements the power estimate of the out-of-band interference based on the received composite sample, the hypothesis of the sample of the first OFDM transmission scheme and an estimated channel.

9. The method of claim 1,
wherein a correlation coefficient of power estimates corresponding to a predetermined subcarrier distance of 50 indicates that the power estimates are totally correlated.

10. The method of claim 1,
wherein a distribution of the out-of-band interference on each subcarrier of the first OFDM transmission scheme is Gaussian with zero mean.

11. An interference cancellation method, comprising:
receiving a composite sample comprising a sample of a first Orthogonal Frequency Division Multiplexing (OFDM) transmission scheme interfered by an out-of-band interference of a second OFDM transmission scheme different from the first OFDM transmission scheme, the first OFDM transmission scheme comprising a plurality of resource elements arranged in a symbol-subcarrier grid, wherein a plurality of subcarriers are partitioned into a plurality of non-data bearing subcarriers and a plurality of data bearing subcarriers;
determining a first estimate of the out-of-band interference according to the plurality of non-data bearing subcarriers using an interference variance that is associated with the out-of-band interference of the second OFDM transmission scheme, the interference variance being estimated with respect to the plurality of subcarriers;
determining a second estimate of the out-of-band interference according to the plurality of data bearing subcarriers based on the first estimate; and
cancelling the out-of-band interference based on the composite sample and the second estimate.

12. The method of claim 1,
wherein the first OFDM transmission scheme comprises a transmission scheme of a Long Term Evolution (LTE) network; and
wherein the second OFDM transmission scheme comprises a transmission scheme of a WiFi network.

13. The method of claim 11,
wherein the first OFDM transmission scheme comprises a cellular transmission scheme; and wherein the second OFDM transmission scheme comprises a wireless network transmission scheme.

14. The method of claim 11, comprising:
determining the first estimate of the out-of-band interference by using a Minimum Mean Square Error (MMSE)-based estimator.

15. The method of claim 11, comprising:
determining the second estimate of the out-of-band interference by using a correlation property between the plurality of non-data bearing subcarriers and the plurality of data bearing subcarriers.

16. The method of claim 11, comprising:
determining the second estimate of the out-of-band interference based on a scaling of the first estimate of the out-of-band interference.

17. The method of claim 16, comprising
scaling the first estimate of the out-of-band interference with a variance of the out-of-band interference at the plurality of data bearing subcarriers.

18. The method of claim 17, comprising:
estimating the variance of the out-of-band interference at the plurality of data bearing subcarriers.

19. The method of claim 18,
wherein the estimating the variance of the out-of-band interference comprises:
determining for each of the plurality of resource elements a corresponding power estimate of the out-of-band interference;
estimating the variance at a resource element based on filtering the plurality of power estimates over subcarriers of the symbol-subcarrier grid which of the plurality of subcarriers correspond to a same symbol of the symbol-subcarrier grid; and
adjusting weights of the filtering based on a correlation property of the plurality of power estimates with respect to the subcarriers.

20. The method of claim 12, comprising:
cancelling the out-of-band interference based on a subtraction of the second estimate of the out-of-band interference from the composite sample.

21. The method of claim 11,
wherein the first OFDM transmission scheme comprises a transmission scheme of a Long Term Evolution (LTE) network; and
wherein the second OFDM transmission scheme comprises a transmission scheme of a WiFi network.

22. The method of claim 11, wherein the interference variance is estimated by filtering a plurality of power estimates associated with the plurality of subcarriers, the filtering being performed by using a filter length corresponding to correlation properties of samples of the second OFDM transmission scheme.

23. An interference variance estimator, comprising:
a receiving port configured to receive a composite sample comprising a sample of a first Orthogonal Frequency Division Multiplexing (OFDM) transmission scheme interfered by an out-of-band interference of a second OFDM transmission scheme different from the first OFDM transmission scheme, the first OFDM transmission scheme comprising a plurality of resource elements arranged in a symbol-subcarrier grid;
a first circuit configured to determine, for each of the resource elements, a power estimate of the out-of-band interference; and
a second circuit configured to filter a plurality of power estimates over subcarriers corresponding to a same symbol of the symbol-subcarrier grid to obtain the interference variance, the filtering being performed by using a filter length corresponding to correlation properties of samples of the second OFDM transmission scheme, and
wherein weights of the filtering are based on a correlation property of the plurality of power estimates with respect to the subcarriers.

24. The interference variance estimator of claim 23,
wherein the second circuit comprises a Minimum Mean Square Error (MMSE) filter configured to filter the power estimates.

25. The interference variance estimator of claim 23,
wherein the first OFDM transmission scheme comprises a transmission scheme of a Long Term Evolution (LTE) network; and
wherein the second OFDM transmission scheme comprises a transmission scheme of a WiFi network.

26. An interference canceller, comprising:
a receiving port configured to receive a composite sample comprising a sample of a first OFDM transmission scheme interfered by an out-of-band interference of a second OFDM transmission scheme different from the first OFDM transmission scheme, the first OFDM transmission scheme comprising a plurality of resource elements arranged in a symbol-subcarrier grid, wherein the subcarriers are partitioned into a plurality of non-data bearing subcarriers and a plurality of data bearing subcarriers;
a first circuit configured to determine a first estimate of the out-of-band interference according to the plurality of non-data bearing subcarriers using an interference variance that is associated with the out-of-band interference of the second OFDM transmission scheme, the interference variance being estimated with respect to the plurality of subcarriers;
a second circuit configured to determine a second estimate of the out-of-band interference according to the plurality of data bearing subcarriers based on the first estimate; and
a third circuit configured to cancel the out-of-band interference based on the composite sample and the second estimate.

27. The interference canceller of claim 26, wherein the first circuit comprises an Minimum Mean Square Error (MMSE) filter configured to determine the first estimate.

28. The interference canceller of claim 26, wherein the second circuit is configured to determine the second estimate based on a scaling of the first estimate with a variance of the out-of-band interference at the plurality of data bearing subcarriers.

29. The interference canceller of claim 26,
wherein the first OFDM transmission scheme comprises a transmission scheme of a Long Term Evolution (LTE) network; and
wherein the second OFDM transmission scheme comprises a transmission scheme of a WiFi network.

* * * * *